US012634408B2

(12) United States Patent
Pala et al.

(10) Patent No.: US 12,634,408 B2
(45) Date of Patent: *May 19, 2026

(54) VIDEO ROUTERS AND RELATED METHODS WITH INTEGRATED AUDIO MIXING AND PROCESSING

(71) Applicant: Ross Video Limited, Iroquois (CA)

(72) Inventors: Michael Pala, Kemptville (CA); A. Matthew Zimmer, Virginia Beach, VA (US); Donald Mark Sizemore, Virginia Beach, VA (US); Yu Liu, Ottawa (CA)

(73) Assignee: Ross Video Limited, Iroquois (CA)

( * ) Notice: Subject to any disclaimer, the term of this patent is extended or adjusted under 35 U.S.C. 154(b) by 106 days.

This patent is subject to a terminal disclaimer.

(21) Appl. No.: 18/658,302

(22) Filed: May 8, 2024

(65) Prior Publication Data

US 2024/0291933 A1 Aug. 29, 2024

Related U.S. Application Data

(63) Continuation of application No. 17/066,168, filed on Oct. 8, 2020, now Pat. No. 12,015,867.

(51) Int. Cl.
*H04N 5/265* (2006.01)
*G06F 3/16* (2006.01)
(Continued)

(52) U.S. Cl.
CPC ............. *H04N 5/265* (2013.01); *G06F 3/165* (2013.01); *H04L 12/56* (2013.01); *H04L 65/612* (2022.05);
(Continued)

(58) Field of Classification Search
CPC .... H04N 5/265; H04N 5/268; H04N 21/2368; H04L 65/612; H04L 12/56; G06F 3/165
See application file for complete search history.

(56) References Cited

U.S. PATENT DOCUMENTS

| | | | | |
|---|---|---|---|---|
| 5,444,676 A | * | 8/1995 | Balsamo | ................ H04H 60/04 |
| | | | | 381/119 |
| 5,999,966 A | | 12/1999 | McDougall | |

(Continued)

OTHER PUBLICATIONS

Office Action issued on Jul. 20, 2023 in respect of U.S. Appl. No. 17/066,168 (13 pages).

(Continued)

*Primary Examiner* — Yassin Alata
(74) *Attorney, Agent, or Firm* — Cesari and McKenna, LLP; Omar M. Wadhwa

(57) ABSTRACT

Video routing may include integrated audio mixing, audio processing, or both. An audio subsystem that is integrated with a video router, for example, may receive and mix router input audio signals to provide mixed audio signals, and route the mixed audio signals to router outputs as router output audio signals. Regarding audio processing, input audio signals that include router input audio signals that are received by the video router may be routed as output audio signals. The output audio signals include router output audio signals to be output from the video router. Respective ones of the output audio signals are processed to provide respective processed output audio signals. The input audio signals for the routing also include the processed output audio signals.

21 Claims, 13 Drawing Sheets

(51) Int. Cl.

| | | |
|---|---|---|
| *H04L 12/54* | (2022.01) | |
| *H04L 65/612* | (2022.01) | |
| *H04N 5/268* | (2006.01) | |
| *H04N 21/2368* | (2011.01) | |

(52) U.S. Cl.
CPC ......... *H04N 5/268* (2013.01); *H04N 21/2368* (2013.01)

(56) References Cited

U.S. PATENT DOCUMENTS

| | | | |
|---|---|---|---|
| 6,346,964 B1 | 2/2002 | Rogers | |
| 7,184,560 B2 | 2/2007 | Ajamian | |
| 9,620,169 B1 | 4/2017 | Nolan | |
| 2007/0139561 A1 | 6/2007 | Kawabata | |
| 2008/0117937 A1 | 5/2008 | Firestone | |
| 2008/0180573 A1 | 7/2008 | Cooper | |
| 2008/0198838 A1 | 8/2008 | Moote | |
| 2008/0231687 A1 | 9/2008 | Baird | |
| 2012/0026327 A1* | 2/2012 | Jackson | H04N 5/272 348/143 |
| 2013/0312041 A1 | 11/2013 | Gresta | |
| 2015/0358553 A1 | 12/2015 | Cox | |
| 2016/0050375 A1 | 2/2016 | Soffer | |
| 2016/0248989 A1 | 8/2016 | Cross | |
| 2018/0221762 A1* | 8/2018 | Noguchi | A63F 13/352 |
| 2018/0254066 A1 | 9/2018 | Elder | |
| 2019/0155565 A1 | 5/2019 | Allen | |

OTHER PUBLICATIONS

Notice of Allowance issued on Feb. 7, 2024 in respect of U.S. Appl. No. 17/066,168 (8 pages).

* cited by examiner

VIDEO ROUTERS AND RELATED METHODS WITH INTEGRATED AUDIO MIXING AND PROCESSING

CROSS-REFERENCE TO RELATED APPLICATION

The present application is a continuation of U.S. patent application Ser. No. 17/066,168, filed on Oct. 8, 2020 and entitled "VIDEO ROUTERS AND RELATED METHODS WITH INTEGRATED AUDIO MIXING AND PROCESS-ING", the entire contents of which are incorporated herein by reference.

FIELD

The present disclosure relates generally to video routers and, in particular, to video routers and routing methods with integrated mixing, processing, or both mixing and process-ing of audio signals some embodiments.

BACKGROUND

A video router is an electronic device that is used to route video signals and/or audio signals from one or more input sources to one or more outputs. A video router may include a video crosspoint switch to connect video signals from inputs to outputs, and an audio crosspoint switch to connect audio signals from inputs to outputs.

Operations such as mixing and/or any of various types of processing may be applied to audio signals. An audio mixer, for example, is an electronic device that is used to combine audio signals to generate mixed audio signals. To mix audio signals, an audio mixer applies gain values to audio signals and then sums the audio signals after the gain values have been applied. Mixing, processing, or both may be applied to audio signals.

An external or outboard audio mixer may be connected to a video router, to receive and mix audio signals. Audio signal processing may also or instead be implemented externally from a video router.

SUMMARY

According to some embodiments disclosed herein, audio mixing is integrated with video routing. For example, an audio mixing subsystem that supports audio signal mixing, and possibly audio signal processing, may be integrated with a video router instead of as an external or outboard compo-nent.

Integrating audio signal processing into a video router, with or without integrated audio signal mixing, may provide enhanced flexibility for such processing, as also disclosed herein.

An aspect of the present disclosure relates to a video router that includes router inputs to receive router input video signals and router input audio signals, router outputs to provide router output video signals and router output audio signals, and an audio subsystem. The audio subsystem is coupled to the router inputs and the router outputs, to receive and mix a plurality of the router input audio signals to provide mixed audio signals, and to route the mixed audio signals to the router outputs as the router output audio signals.

Another aspect of the present disclosure relates to a method that involves receiving router input video signals and router input audio signals at router inputs of a video router; receiving and mixing, by an integrated audio sub-system of the video router, a plurality of the router input audio signals to generate mixed audio signals; and providing router output video signals and router output audio signals to router outputs of the video router. Providing router output video signals involves routing, by the integrated audio subsystem, the mixed audio signals to the router outputs as the router output audio signals.

The present disclosure also relates, in part, to a video router that includes a video crosspoint switch to receive router input video signals received by the video router and to route the router input video signals as router video output signals to be output from the video router, an audio cros-spoint switch to receive input audio signals including router input audio signals received by the video router and to route the input audio signals as output audio signals that include router output audio signals to be output from the video router; and a processing subsystem. The processing subsys-tem is to provide a plurality of processing paths to receive and process respective ones of the output audio signals from the audio crosspoint switch and to generate respective processed output audio signals. The input audio signals of the audio crosspoint switch further include the processed output audio signals of the processing paths.

A method according to another aspect of the present disclosure involves receiving router input video signals that are received by a video router; routing the router input video signals as router video output signals to be output from the video router; receiving input audio signals that include router input audio signals that are received by the video router; routing the input audio signals as output audio signals that include router output audio signals to be output from the video router; and processing respective ones of the output audio signals to provide respective processed output audio signals, the input audio signals for the routing further comprising the processed output audio signals.

A non-transitory processor-readable medium may store instructions which, when executed by a processor, cause the processor to perform any of the methods disclosed herein, including those described above.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompa-nying drawings.

DETAILED DESCRIPTION

Figure 1:
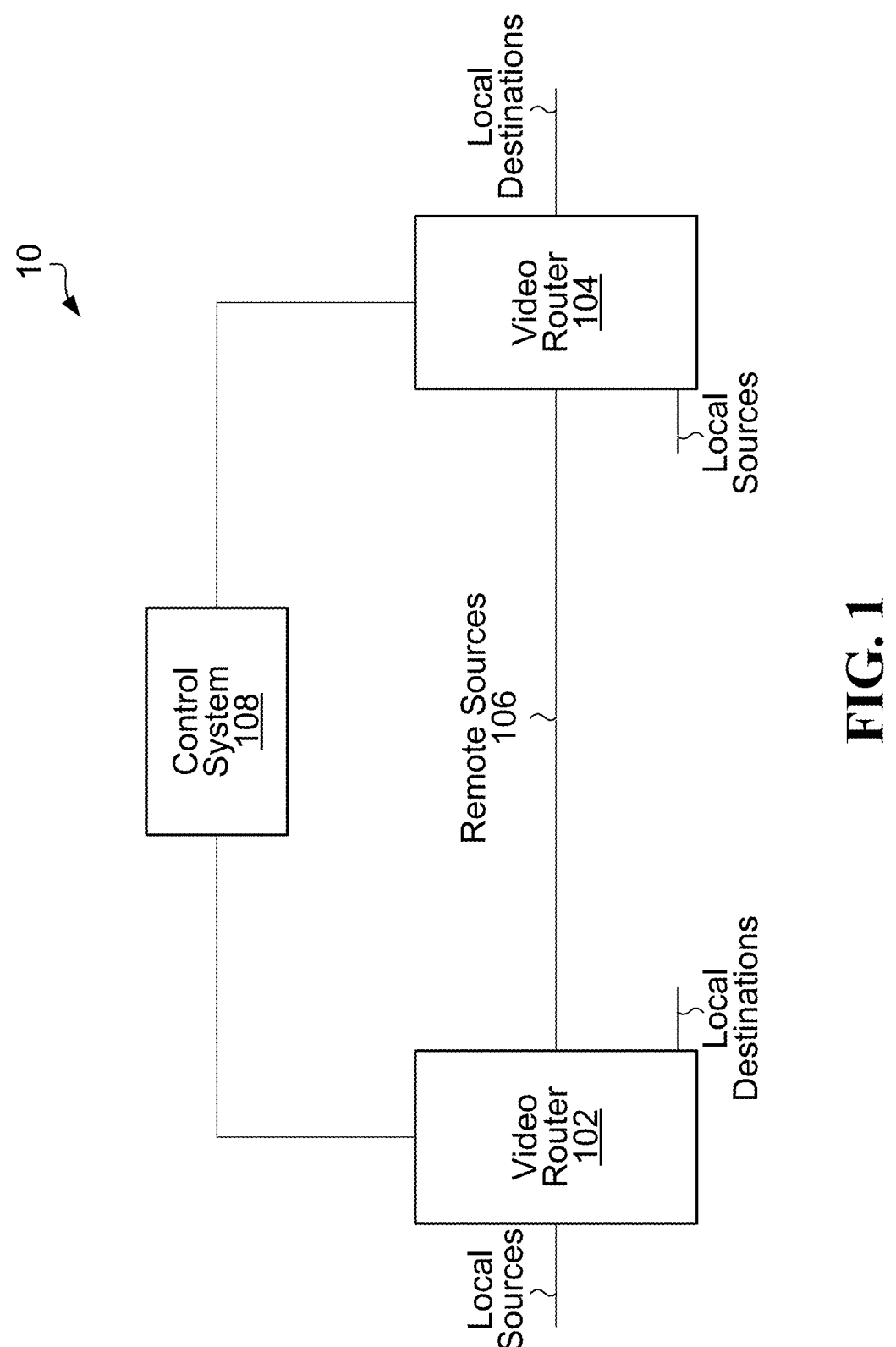
FIG. 1 is a block diagram illustrating an example of a system in which embodiments may be implemented.

Example embodiments are discussed in detail herein. It should be appreciated, however, that the present disclosure provides concepts that can be embodied in any of a wide variety of specific contexts. The embodiments discussed are merely illustrative, and do not limit the scope of the present disclosure.

Existing video router architectures often use separate, outboard audio mixers to mix audio signals. With such implementations, audio mixing is limited by the capabilities and structure of the outboard audio mixer(s). For example, multiple outboard audio mixers might be required to support different types of audio signal pre-processing or mixing. Outboard audio mixers also tend to be limited in terms of the types of inputs or input signals that are supported or made available. In general, the use of one or more external or outboard audio mixers results in increased cost and an increased physical footprint associated with a video routing system that includes a video router and such external or outboard audio mixer(s).

Some embodiments disclosed herein provide a video router with integrated audio mixing capabilities. Such integrated audio mixing provides a video routing solution that eliminates need for a separate outboard audio mixer, and may therefore realize cost savings, physical footprint or space savings, and weight savings relative to conventional approaches that use one or more separate outboard audio mixers. As well, the integration of audio mixing with video routing eliminates the need for additional connection cabling associated with separate outboard audio mixers, thus reducing the amount of material, space, and weight associated with a routing system. Time and cost associated with routing system installation, and the potential for cabling errors may also be reduced by reducing the overall amount of connection cabling used in a video routing system.

In some embodiments, a video router is implemented using a Field Programmable Gate Array (FPGA)-based architecture with a Time-Division Multiplexed (TDM) internal audio architecture to integrate audio mixing, and possibly associated processing operations or components. The use of an FPGA-based integrated design in some embodiments is a technical innovation that may allow for increased functional flexibility for audio mixing, and potentially also or instead for audio signal processing.

For example, video routing with integrated audio mixing may provide for selective or otherwise flexible partitioning of an audio mixer into one or more mixers, which may also be referred to as sub-mixers. Integration of audio mixing with video routing may also or instead enable an audio mixer to access a full range of video router inputs and/or outputs, which might not otherwise be possible or feasible for outboard audio mixer implementations.

Video routing with integrated audio signal processing, which may be implemented with or without integrated audio mixing, may support selective or otherwise flexible reordering of audio signal processing operations or components. An integrated design may also or instead provide additional FPGA-based processing blocks or operations with low latency. For example, in some embodiments additional processing components or operations may be selectively added to a video router at any time, and such additional processing components or operations can be placed at any desired point within a signal processing path or chain, also sometimes referred to as a signal chain. An integrated design may additionally or instead enable selective use of some or all audio signal processing components or operations separately from an audio mixer.

FIG. 1 is a block diagram illustrating an example of a system in which embodiments may be implemented. In the example system 10, two video routers 102, 104 are connected by one or more connections 106. Video routing is controlled in the example system 10 by the control system 108. Each of the video routers 102, 104 in this example has local source inputs and outputs to local destinations. FIG. 1 represents an example system in which one or more connections 106 interconnect the video routers 102, 104 to switch remote sources between the video routers, but this is an illustrative example. Embodiments disclosed herein may be implemented on a per-router basis, in systems that include one, or more than one, video router.

Figure 2:
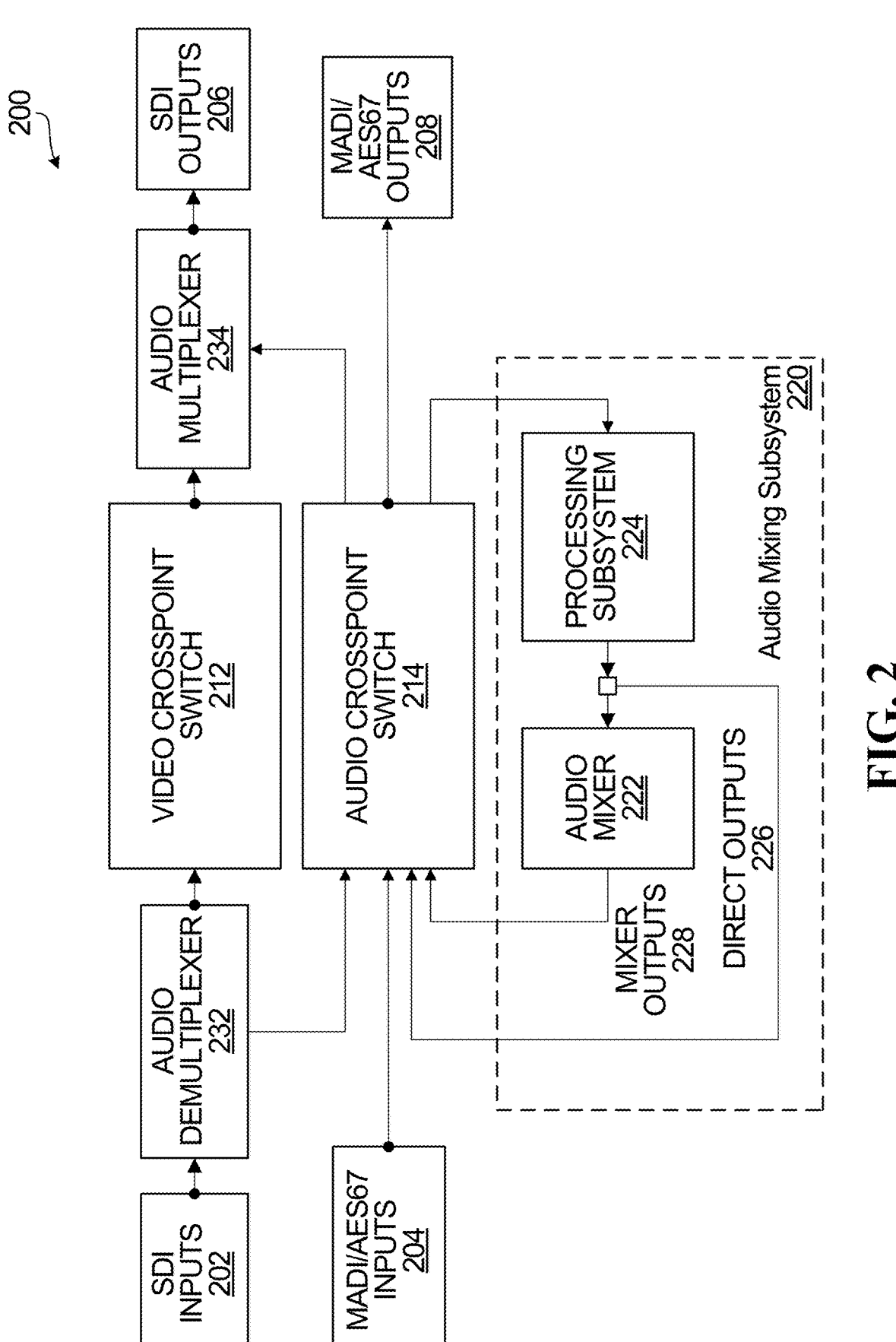
FIG. 2 is a block diagram of an example video router with an integrated audio mixing subsystem.

FIG. 2 is a block diagram of an example video router with an integrated audio mixing subsystem. The video router 200 includes inputs 202 and 204, outputs 206 and 208, a video crosspoint switch 212, an audio crosspoint switch 214, an audio mixing subsystem 220, an audio demultiplexer 232, and an audio multiplexer 234. The video crosspoint switch is coupled to the inputs 202, through the audio demultiplexer 232, and to the outputs 206, through the audio multiplexer 234. The audio crosspoint switch 214 is coupled to the inputs 204 and to the outputs 208 directly, and is also coupled to the inputs 202, through the audio demultiplexer 232, and to the outputs 206, through the audio multiplexer 234. The audio crosspoint switch 214 is also coupled to the audio mixing subsystem 220. The audio mixing subsystem 220 in the example video router 200 includes a processing subsystem 224 and an audio mixer 222. The processing subsystem 224 is coupled to one or more outputs of the audio crosspoint switch 214. One or more outputs of the processing subsystem 224 may be coupled to either or both of: one or more inputs of the audio mixer 222; and one or more inputs of the audio crosspoint switch 214. Outputs from the processing subsystem 224 coupled to inputs of the audio crosspoint switch 214 are referred to herein as direct outputs, and are shown by way of example at 226. One or more outputs of the audio mixer 222 are coupled to one or more inputs of the audio crosspoint switch 214, and are referred to herein as mixer outputs, shown by way of example at 228.

In general, an input or an output, such as inputs 202 and 204 and outputs 206 and 208 shown in FIG. 2, may include some sort of physical component such as a physical port or connector, and may also include one or more other components to support transfer of signals through that port or connector. The particular structure of an input or an output will be dependent upon such characteristics as the type of connection over which signal transfer is to be supported and/or the signal type(s) that are to be supported, for example. This also applies to, for example, the direct outputs 226 and to inputs and outputs of the individual components shown in FIG. 2.

One or more of the video crosspoint switch 212, the audio crosspoint switch 214, the audio demultiplexer 232, the audio multiplexer 234, the audio mixing subsystem 220, or one or more elements of these components, may be implemented using hardware, firmware, components which execute software, or some combination thereof. Electronic devices that might be suitable for this purpose include, among others, microprocessors, microcontrollers, Programmable Logic Devices (PLDs), FPGAs, Application Specific Integrated Circuits (ASICs), and other types of "intelligent" integrated circuits. In some embodiments, a video router with an integrated audio mixing subsystem, an integrated audio mixer, or an integrated processing subsystem is FPGA-based. For example, a mixing subsystem such as the mixing subsystem 220 may be implemented as a self-contained block or component in the same FPGA as other components of a video router, such as those shown in FIG. 2. Software-based integration, and other realizations of integrated components or features, are also possible.

To at least some extent, the types of inputs, outputs, and interconnections may be implementation-dependent. For example, in implementations that involve software, the router inputs 202, 204 and outputs 206, 208 may be or include physical ports or connectors to receive router input signals and provide router output signals, but internal connections may be or include logical connections through which components exchange signals.

In operation, router input signals are received at the router inputs 202 and 204, and routed as router output signals for output through the router outputs 206, 208. FIG. 2 illustrates non-limiting examples of router inputs and router outputs. SDI inputs 202 represent inputs through which Serial Digital Interconnect (SDI) baseband video signals may be received as router input signals by the video router 200. An SDI signal is an example of a video signal that includes an embedded audio signal, and is provided to the audio demultiplexer 232 in the video router 200. The audio demultiplexer 232 separates a video signal that includes an embedded audio signal into its audio and video signal components. This may also be referred to as extracting or separating an embedded audio signal from a video signal, or extracting or separating a video signal from an input signal that also includes an embedded audio signal. The audio demultiplexer 232 provides extracted audio signals as input signals to the audio crosspoint switch 214.

MADI/AES67 inputs 204 represent inputs through which audio signals of either of the following types may be received as router input signals: Multiple Audio Digital Interface (MADI) or digital audio over Internet Protocol (IP) compliant with the Audio Engineering Society standard 67 (AES67).

SDI, MADI, and AES67 are examples of signal types or formats that may be received and/or output by a video router. Other types of inputs, outputs, and signals may also or instead be routed by a video router, including Dante® input/output (I/O) and current or future discrete audio I/O, for example. Embodiments disclosed herein are not dependent upon any particular types of inputs, outputs, or signals.

The video crosspoint switch 212 receives video signals, including the video signal components extracted by the audio demultiplexer 232 in the example shown, at its inputs and routes these video signals to its outputs. In general, a video crosspoint switch such as the video crosspoint switch 212 receives video signals at its inputs and allows such input signals to be connected, or in other words "routed", to any of its outputs, which in turn may be coupled to router outputs or additional processing components. In some embodiments, as shown, video crosspoint switch outputs may be coupled to the router outputs 206 through the audio multiplexer 234.

The audio crosspoint switch 214 receives the audio signals, such as the audio signal components extracted by the audio demultiplexer 232 from signals received at the SDI inputs 202 in the example shown. The audio crosspoint switch 214 also directly receives audio signals that are received by the audio inputs 204, and further audio signals from both the mixer outputs 228 and the direct outputs 226 from the audio mixing subsystem 220. The audio crosspoint switch 214 may route audio signals at any of its inputs to any of its outputs. This allows input audio signals received through any of the inputs 202 or 204, mixed audio signals provided by the audio mixer 222, or processed audio signals provided by the processing subsystem 224 to be routed for processing or further processing by the audio mixing subsystem 220 or one or more additional processing subsystems (not shown), or for output from the video router 200. Audio signals may be output from the video router 200 through audio outputs, such as the outputs 208, or through the audio multiplexer 234. In general, an audio crosspoint switch such as the audio crosspoint switch 214 receives audio signals at its inputs and allows such input audio signals to be connected or routed to any of its outputs, which in turn may be coupled to router outputs or additional processing components.

In some implementations, the audio crosspoint switch 214 may be a TDM audio crosspoint switch that is capable of accepting up to 6000 independent audio input signals, and controlling which of these audio input signals are connected to each of up to 6000 audio outputs. In the example video router 200, audio input signals may include any one or more of the following: MADI/AES67 input signals received at the inputs 204, demultiplexed audio components of SDI input signals received at the inputs 202, mixed audio signals received from the mixer outputs 228, and processed audio signals received from the direct outputs 226 from audio mixing subsystem 220.

The audio multiplexer 234 multiplexes output video signals from the video crosspoint switch 212 and output audio signals from the audio crosspoint switch 214, embedding the output audio signals into SDI video signals for output through the video outputs 206 in the example shown. More generally, an audio multiplexer such as the audio multiplexer 234 accepts both video signals and audio signals as its inputs and allows the audio signals to be embedded into the video signals. With the same combined video and audio signal format for input and output, in particular SDI in the example shown, the audio multiplexer 234 implements the inverse operation or function of the audio demultiplexer 232, and equivalently the audio demultiplexer implements the inverse operation or function of the audio multiplexer.

The outputs 206 and 208 are SDI outputs and MADI/AES67 outputs, respectively, and represent outputs through which SDI signals and MADI/AES67 signals may be output or emitted from the video router 200. SDI output signals in the example shown are SDI baseband video signals that include embedded audio signals, and are output from the audio multiplexer 234. MADI/AES67 output signals are audio output signals from the audio crosspoint switch 214.

The audio mixing subsystem 220, is an illustrative and non-limiting example of an audio mixing subsystem that may be integrated with or into a video router such as the video router 200. The audio mixing subsystem 220 includes the audio mixer 222 and the processing subsystem 224 in the example shown, and in other embodiments an audio mixing subsystem might not include a processing subsystem.

The processing subsystem 224 may include multiple processing chains or paths, to implement per-channel processing for example. In some embodiments, signals are associated with respective channels, and a processing path applies one or more processing operations to an audio signal that is received on a particular channel. More generally, any of various functions may be applied to audio signals received by the audio mixing subsystem 220 from the audio crosspoint switch 214. Audio signal processing may include application of one or more processing operations or functions, which may be applied in any determined order. The processing operations or functions may include, but are not limited to: equalization filtering, compression, limiting, noise gating, delay, and possibly other transformations. Following the application of the processing function(s), a copy of the processed audio signal(s) may be returned to the audio crosspoint switch 214 via the direct outputs 228. Alternatively, in some embodiments direct outputs from the processing subsystem 224 to an input of the audio crosspoint switch 214 need not necessarily be provided.

If the processing subsystem 224 is included as part of the audio mixing subsystem 220, then any one or more of the processed audio signal(s), from one or more channels or paths of the processing subsystem 224, may be used as input signals of the audio mixer 222. As also disclosed herein, one or more processed audio signals may be provided only to an audio crosspoint switch and not to an audio mixer. Thus, a processed audio signal may be provided to an audio mixer such as the audio mixer 222, to an audio crosspoint switch such as the audio crosspoint switch 214, or to both an audio mixer and an audio crosspoint switch.

The audio mixer 222 mixes audio signals, which are processed audio signals received from the processing subsystem 224 in the example shown, at different weights or ratios. In an embodiment, the audio mixer 222 applies user-determined gain values to each of the processed audio signals. The user-determined gain values may be selected, or gain values may be otherwise set or configured, to be the same value or different values. The gain values determine the weights or ratios at which audio signals are combined into a mixed signal. Subsequent to the application of the gain values, input audio signals are then summed to generate mixed signals at the mixer outputs 228, and those mixed signals are provided back to the audio crosspoint switch 214 as audio input signals in the example shown.

Figure 3:
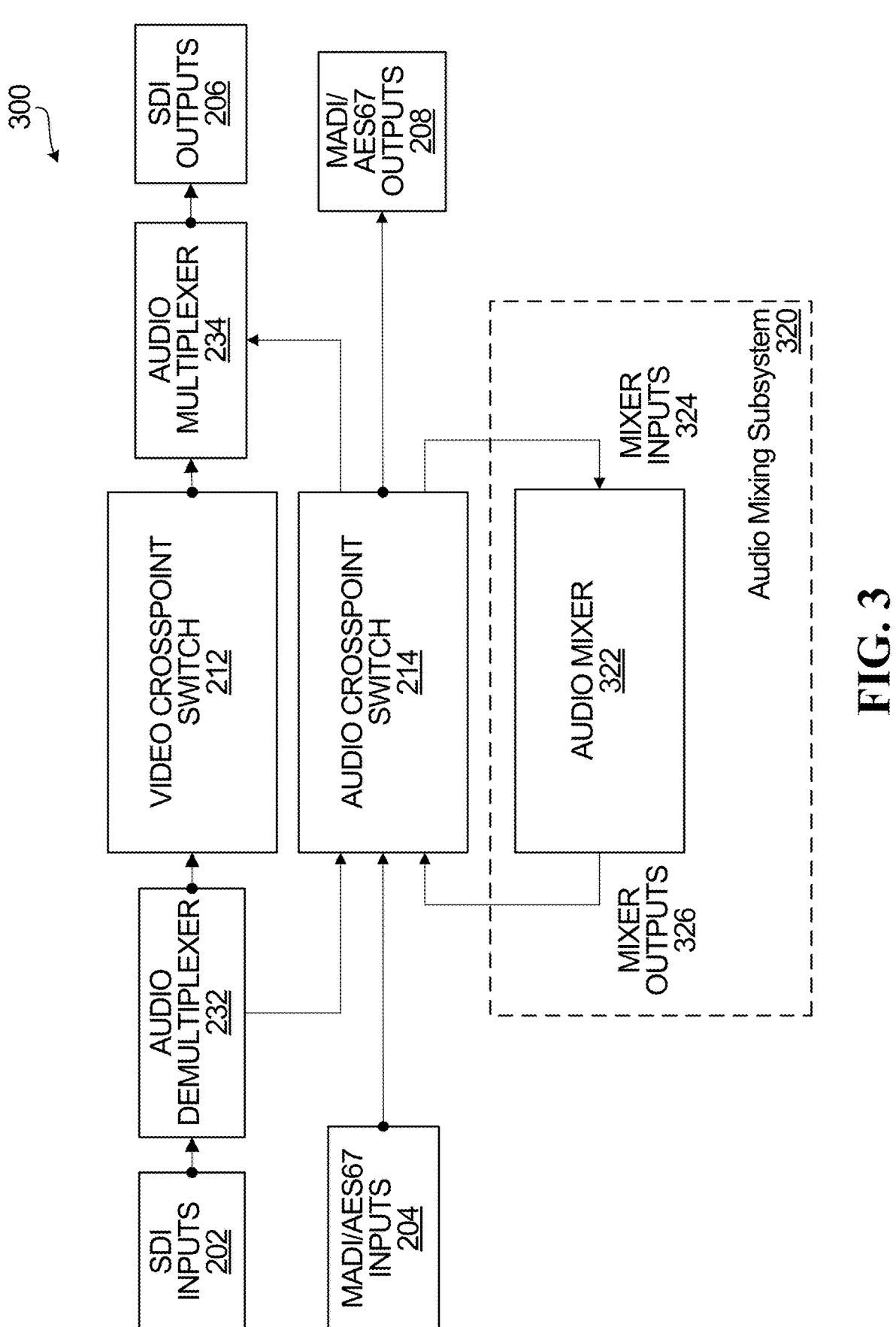
FIG. 3 is a block diagram of another example video router with a different from of an integrated audio mixing subsys-tem.

FIG. 3 is a block diagram of another example video router with a different from of an integrated audio mixing subsystem. The video router 300 is substantially similar to the video router 200. In the video router 300, however, the audio crosspoint switch 214 is coupled to an audio mixing subsystem 320 that includes an audio mixer 322 but no processing subsystem. Mixer inputs 324 are coupled to outputs of the audio crosspoint switch 214, and mixer outputs 326 are coupled to inputs of the audio crosspoint switch 214.

The audio mixer 322 and other components of the example video router 300 may be implemented in the same manner as described above for the example video router 200, using hardware, firmware, components which execute software, or some combination thereof for example. In some embodiments the video router 300 is FPGA-based.

In operation, the audio mixer 322 is configured as a single unit, with all of the mixer inputs 324 and all of the mixer outputs 326 being used as a single logical mixer unit. Each of the audio signals that is input to the audio mixer 322 from the audio crosspoint switch 214 may be blended in combination with any one or more of the other audio signals that are provided as input signals to the audio mixer 322. The audio mixer 322 may be configured such that each of the audio signals input to the audio mixer 322 has a respective user-determined, or otherwise determined, gain value to enable the audio signals to be mixed at different ratios.

Figure 4:
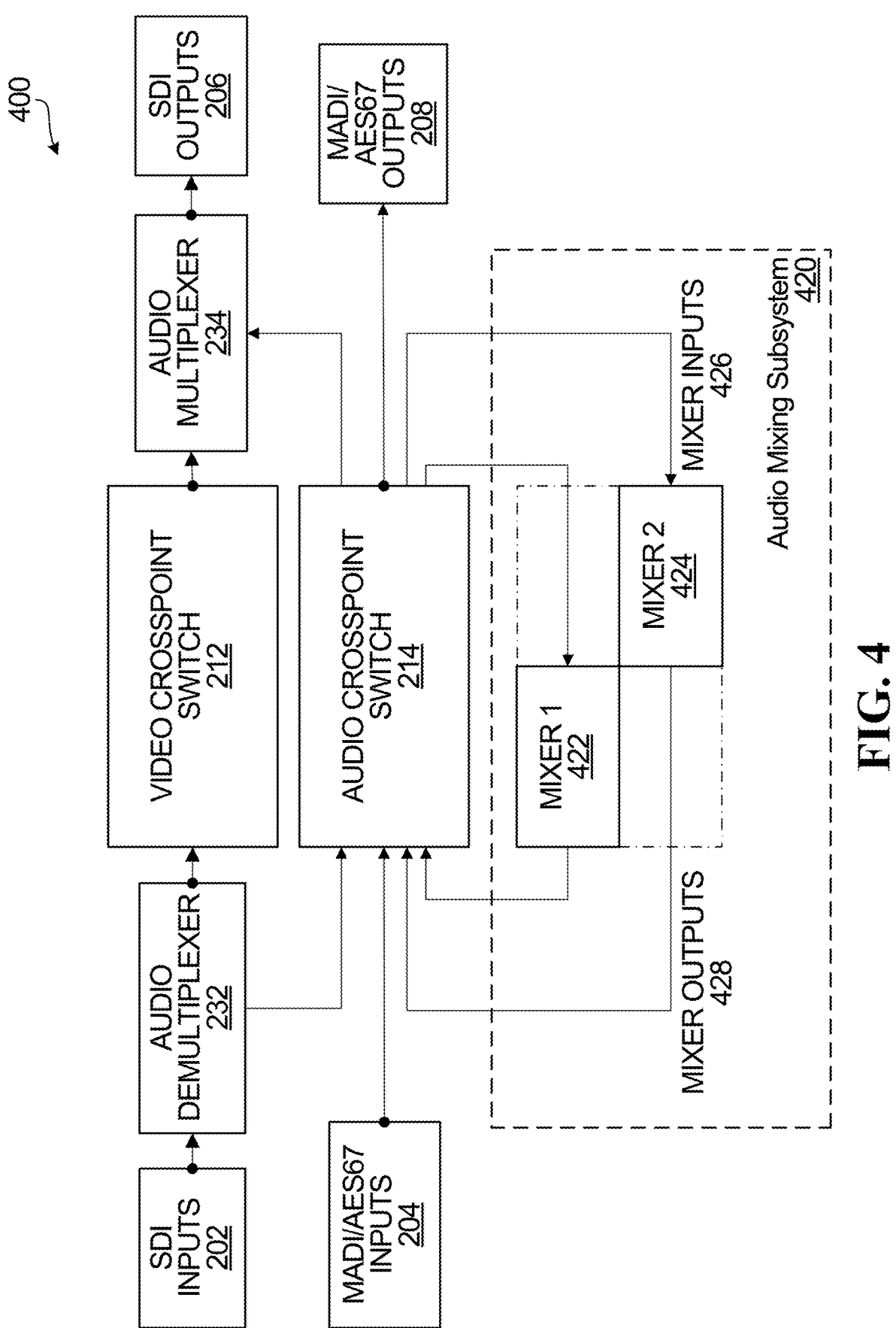
FIG. 4 is a block diagram of another example video router with an integrated audio mixing subsystem that includes a partitioned audio mixer.

FIG. 4 is a block diagram of another example video router with an integrated audio mixing subsystem that includes a partitioned audio mixer. The video router 400 is substantially similar to the video router 300, but the audio mixing subsystem 420 in the video router 400 includes an audio mixer that is partitioned into two sub-mixers, shown as mixer 1 and mixer 2 at 422 and 424, respectively. Mixer inputs 426 are coupled to outputs of the audio crosspoint switch 214, and mixer outputs 428 are coupled to inputs of the audio crosspoint switch 214.

A partitioned audio mixer including mixer 1 and mixer 2, and other components of the example video router 400, may be implemented in the same manner as described above for the example video router 300, using hardware, firmware, components which execute software, or some combination thereof for example. In some embodiments the video router 400 is FPGA-based.

In the audio mixing subsystem 420, an audio mixer is configured to function as though sub-divided into two separate audio mixers, shown as mixer 1 and mixer 2. In some implementations, each of the two mixers 422 and 424 may have access to half of the mixer inputs 426. Similarly, each of the two mixers 422 and 424 may have access to half of the mixer outputs 428. Alternatively, the two mixers 422 and 424 may have access to different numbers of the mixer inputs 426 and/or the mixer outputs 428. Partitioned mixers such as the mixers 422 and 424 need not necessarily be partitioned on even or fixed boundaries; nor do they necessarily need to include or use all mixer inputs or outputs that are available at 426, 428.

Outputs signals at the mixer outputs 428, from each of the two mixers 422 and 424, may be a blend of any one or more of the audio signals received at the mixer inputs 426 that are provided to the same mixer. As in other embodiments, a gain value, which may be user-determined, is applied to each input audio signal prior to mixing. Each of mixer 1 and mixer 2 has access only to its own inputs, and may not access other mixer inputs 426 that provide input signals to the other mixer. For example, a full audio mixer within the audio mixing subsystem 420 may have access to 128 inputs and 64 outputs. Mixer 1 may receive input signals at the first 64 inputs and drive the first 32 outputs, allowing for generation of 32 unique mixed output signals derived from the input signals on the 64 mixer inputs that it is able to access. Mixer 2 may receive input signals at the second 64 inputs and drive the second 32 mixer outputs with mixed audio signals that are generated using only the input signals on the 64 mixer inputs accessible to mixer 2.

Figure 5:
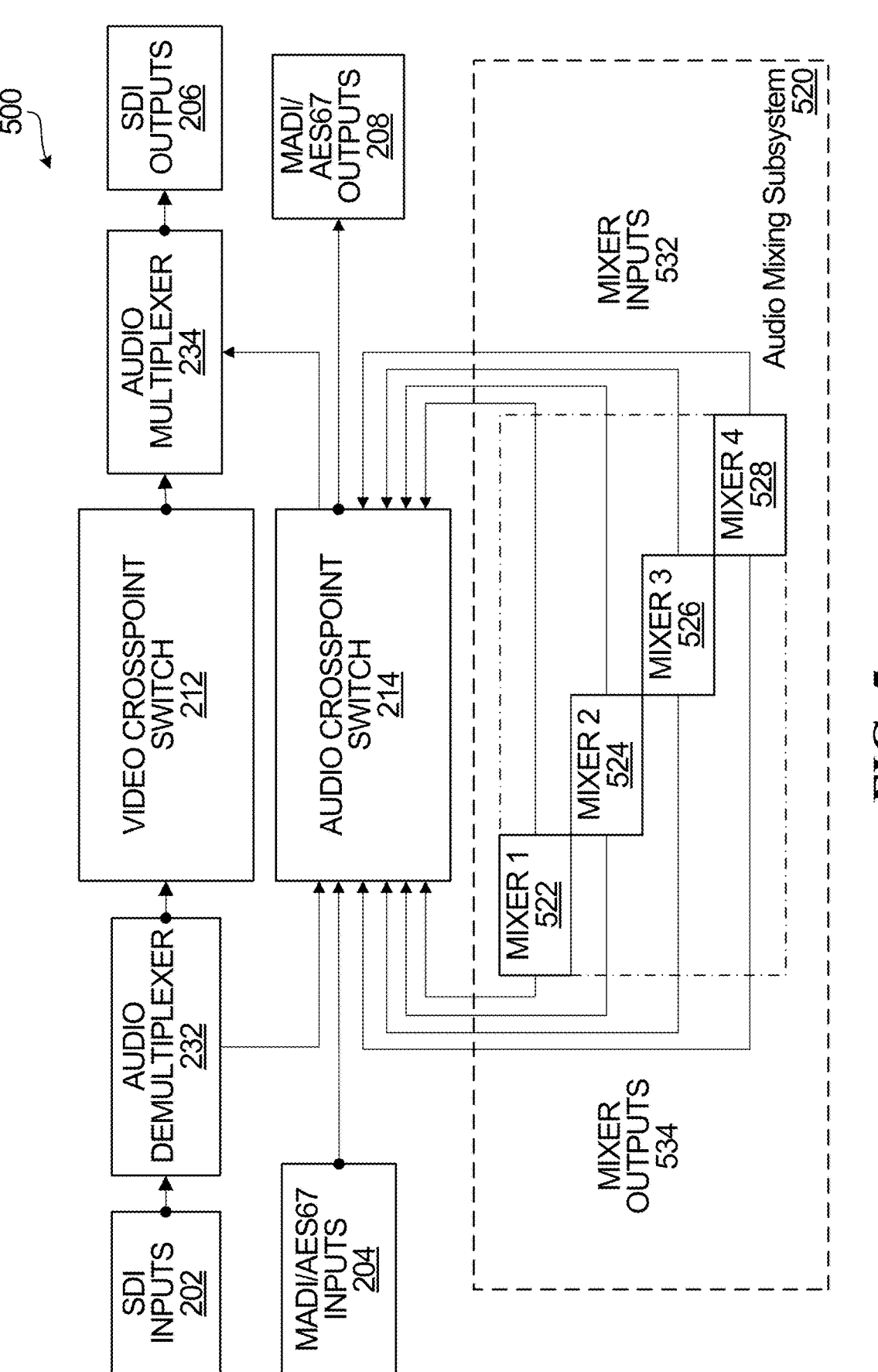
FIG. 5 is a block diagram of another example video router with an integrated audio mixing subsystem that includes a different form of partitioned audio mixer.

FIG. 5 is a block diagram of another example video router with an integrated audio mixing subsystem that includes a different form of partitioned audio mixer. The video router 500 is substantially similar to the video router 400, but the audio mixing subsystem 520 includes an audio mixer that is partitioned into four sub-mixers, shown as mixer 1, mixer 2, mixer 3, and mixer 4 at 522, 524, 426, and 528, respectively. Mixer inputs 532 are coupled to outputs of the audio crosspoint switch 214, and mixer outputs 534 are coupled to inputs of the audio crosspoint switch 214.

A partitioned audio mixer including mixer 1, mixer 2, mixer 3, and mixer 4, and other components of the example video router 500, may be implemented in the same manner as described above for the example video router 300, using hardware, firmware, components which execute software, or some combination thereof for example. In some embodiments the video router 500 is FPGA-based.

In the audio mixing subsystem 520, an audio mixer is configured to function as though sub-divided into four separate audio mixers, shown as mixer 1, mixer 2, mixer 3, and mixer 4. In some implementations, each of the four mixers 522, 524, 526, and 528 may have access to one quarter of the mixer inputs 532. Similarly, each of the four mixers 522, 524, 526, and 528 may have access to one quarter of the mixer outputs 534. Alternatively, the four mixers 522, 524, 526, and 528 may have access to different numbers of the mixer inputs 532 and/or the mixer outputs 534.

Output signals at the mixer outputs 534, from each of the four mixers 522, 524, 526, and 528, may be a blend of any one or more of the audio signals received at the mixer inputs 532 that are provided to the same mixer. A gain value, which may be user-determined, is applied to each input audio signal prior to mixing. Each of mixer 1, mixer 2, mixer 3, and mixer 4 has access only to its own inputs, and may not access other mixer inputs 532 that provide input signals to the other mixers. For example, a full audio mixer within the audio mixing subsystem 520 may have access to 128 inputs and 64 outputs, and each of mixer 1, mixer 2, mixer 3, and mixer 4 receive input signals from a subset of 32 of the mixer inputs 532 and drive a subset of 16 of the mixer outputs 534, allowing for generation of 16 unique mixed output signals by each mixer, derived from the audio signals at the 32 mixer inputs that each mixer is able to access. In this example, each of the mixers 1 to 4 receives input audio signals at 32 unique inputs and drives 16 unique mixer outputs, which are generated using only the input audio signals at the 32 unique mixer inputs that are accessible to each of the mixers.

FIGS. 3 to 5 provide examples in which an audio mixer is configured as one mixer or sub-partitioned into two or more smaller mixers to create the equivalent of separate functional mixers. Such partitioning may, for example, enable more efficient usage of resources. In some operating scenarios or under certain conditions, audio mixing requirements or "demand" may be lower, and audio mixer partitions may be dynamically provisioned or configured on an as-needed basis, to partially or fully use available audio mixing resources.

An ability to rapidly re-partition mixers or mixing resources for different events or setups may be advantageous in that re-wiring, as would often be necessary for an external mixer, may be avoided.

Consider a scenario in which a user may, in one facility, support two simultaneous live productions, each of which has a need for a single audio mixer that should not include audio signals from the other production. Partitioning allows the user to configure mixing in a video router in such a way that two mixers are defined, including one for each production. FIG. 4 illustrates an audio mixing subsystem configuration supporting this scenario.

Another example scenario in which audio mixer partitioning may be useful involves an event space facility that can be set up for one large event or several simultaneous smaller events, each of which may produce a separate live video/audio feed for an audience. FIG. 5 shows an audio mixing subsystem partition arrangement supporting such a scenario, for up to four simultaneous events.

Figure 6:
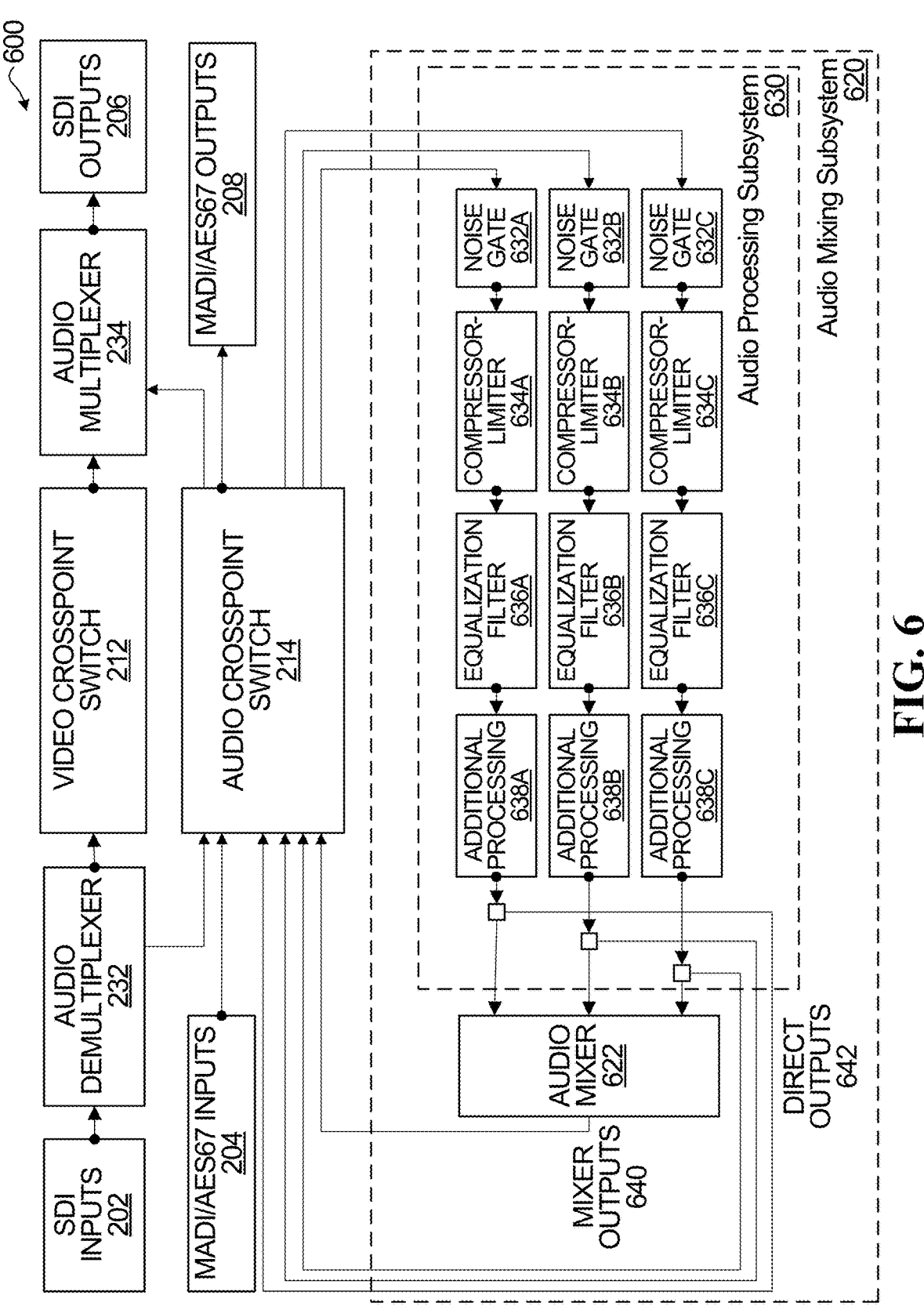
FIG. 6 is a block diagram of another example video router with an integrated audio mixing subsystem that includes a processing subsystem with multiple processing paths.

FIG. 6 is a block diagram of another example video router with an integrated audio mixing subsystem that includes a processing subsystem with multiple processing paths. The video router 600 includes an audio mixing subsystem 620, with an audio processing subsystem 630 and an audio mixer 622. Direct outputs from the audio processing subsystem 630 are shown at 642, and mixer outputs from the audio mixer 622 are shown at 640. The direct outputs 642 and the mixer outputs 640 are coupled to inputs of the audio crosspoint switch 214. Apart from the particular example audio processing subsystem 630, the video router 600 is substantially similar to other example video routers described herein. Implementation options disclosed elsewhere herein also apply to the video router 600 and components thereof, including the audio processing subsystem 630.

The audio processing subsystem 630 includes three processing chains or paths. More or fewer paths may be provided in other embodiments. Processing paths are dynamically configurable in some embodiments, and may be instantiated on an as-needed basis for example. In FIG. 6, each processing path includes: a noise gate 632A, 632B, 632C, coupled to respective outputs of the audio crosspoint switch 214; a compressor-limiter 634A, 634B, 634C, each coupled to a respective one of the noise gates; an equalization filter 636A, 636B, 636C, each coupled to a respective one of the compressor-limiters; and additional processing components 638A, 638B, 638C, each coupled to a respective one of the equalization filters. An output of each of the additional processing components 638A-C may be coupled to an input of the audio mixer 622, and direct outputs 642 of the processing paths may also be coupled to inputs of the audio crosspoint switch 214. The mixer outputs 640 are coupled to other inputs of the audio crosspoint switch 214.

In operation, the audio processing subsystem 630 applies processing operations to audio signals that are received from the audio crosspoint switch 212. In the example shown, the audio processing subsystem 630 includes three processing paths, each of which includes a sequence of processing operations to transform an audio signal at a respective output of the audio crosspoint switch 212. Each processing path may also feed a processed audio signal to a direct output 642, and back to an input of the audio crosspoint switch 214.

With reference now to the processing paths in FIG. 6, a noise gate as shown at 632A-C represents a processing component that mutes or reduces the level of an audio signal when its power level falls below a threshold, which may be a user-specified threshold. A compressor-limiter as shown at 634A-C represents a processing component that reduces a signal's dynamic range by controlling audio levels automatically to fit within a range of levels. An equalization filter as shown at 636A-C represents a processing component that may raise or attenuate selected frequencies within an audio signal. Each additional processing component 638A-C represents a processing component to perform one or more additional transformations on an audio signal. Other transformations that may be applied but have not been separately shown in FIG. 6 may include, for example: delays; delay based effects such as one or more of reverb, chorus, echo, and flanging; modulation; quantization; bit depth reduction; frequency shifting; and convolution, such as for convolution based reverb or audio spatialization effects. All of these transformations, the processing operations for which components are shown in FIG. 6, and others that may be applied in audio signal processing, may transform one or more audio signal properties, such as its sound, content, or dynamic range, for example.

FIG. 6, and subsequent drawings as discussed in further detail below, highlight a direct processing output feature or functionality of an integrated audio processing subsystem. In FIG. 6, direct outputs are shown at 642 in relation to an audio mixing subsystem 620 that includes an audio mixer 622. Processed audio signals on the direct outputs 642 are routed by the audio crosspoint switch 214 to outputs of the audio crosspoint switch 214, which may in turn feed audio signals back into mixing subsystem inputs and processing paths. An audio signal at each mixer input passes through a processing path in which one or more transformations may be performed on the audio signal, before it enters the audio mixer 622 and/or is provided back to the audio crosspoint switch 214 via another direct output at 642. Direct processing output connections shown by way of example at 642 illustrate how a processed audio signal may be provided back to an input of the audio crosspoint switch 214 as an additional input signal, which can be used directly to facilitate cascaded signal processing of audio signals through multiple processing paths.

FIG. 6 further highlights both that a video router may include audio processing and that the mixer output signals may be re-entered, via the audio crosspoint switch 214, to support scenarios in which mixers and processing elements may be cascaded. This may be useful to allow creation of several "sub mixes", for example one mixer to balance each of several groups of related signals such as a choir accompanying an orchestra and a separate mix for the instruments, which then may be fed back in to a "master" mixer that balances a grouped signal such as a live television feed of the event. It may also be useful to refer to FIG. 5 for a further illustration of sub-mixes. As an example, mixed audio signals generated by mixer 1, mixer 2, and mixer 3 may be re-entered as inputs to mixer 4 to create a final output mix of those mixed audio signals.

FIG. 6 also depicts that with re-entry, processing may be applied to a re-entered "final mix" signal, for example to apply compression or equalization to improve frequency balance of the signal or limit signal dynamic range to conform to transmission standards.

Re-entry may enable mixing, processing, or both, to be cascaded. Processing may be cascaded with further processing, mixing may be cascaded with further mixing, or processing and mixing may be cascaded.

Although the processing paths of the audio processing subsystem 630 include certain examples of processing components, the processing components and the order of such processing components or operations are not limited only to the examples and order shown. The number of processing components included in a processing path may be configurable by a user or otherwise controllable. Other processing parameters such as the order of processing components or operations included in a processing path and/or the type(s) processing component(s) or operations included in a processing path may also or instead be configurable or otherwise controllable.

Processing path-level configurability or controllability may also or instead be provided. For example, the number of processing paths in a processing subsystem such as the audio processing subsystem 630 may be configurable, based on such parameters as the number of input signals that the audio mixer 622 is capable of receiving, or the number of outputs that the audio crosspoint switch 214 has available to direct audio signals to the audio processing subsystem 630 or the audio mixing subsystem 620.

Figure 7:
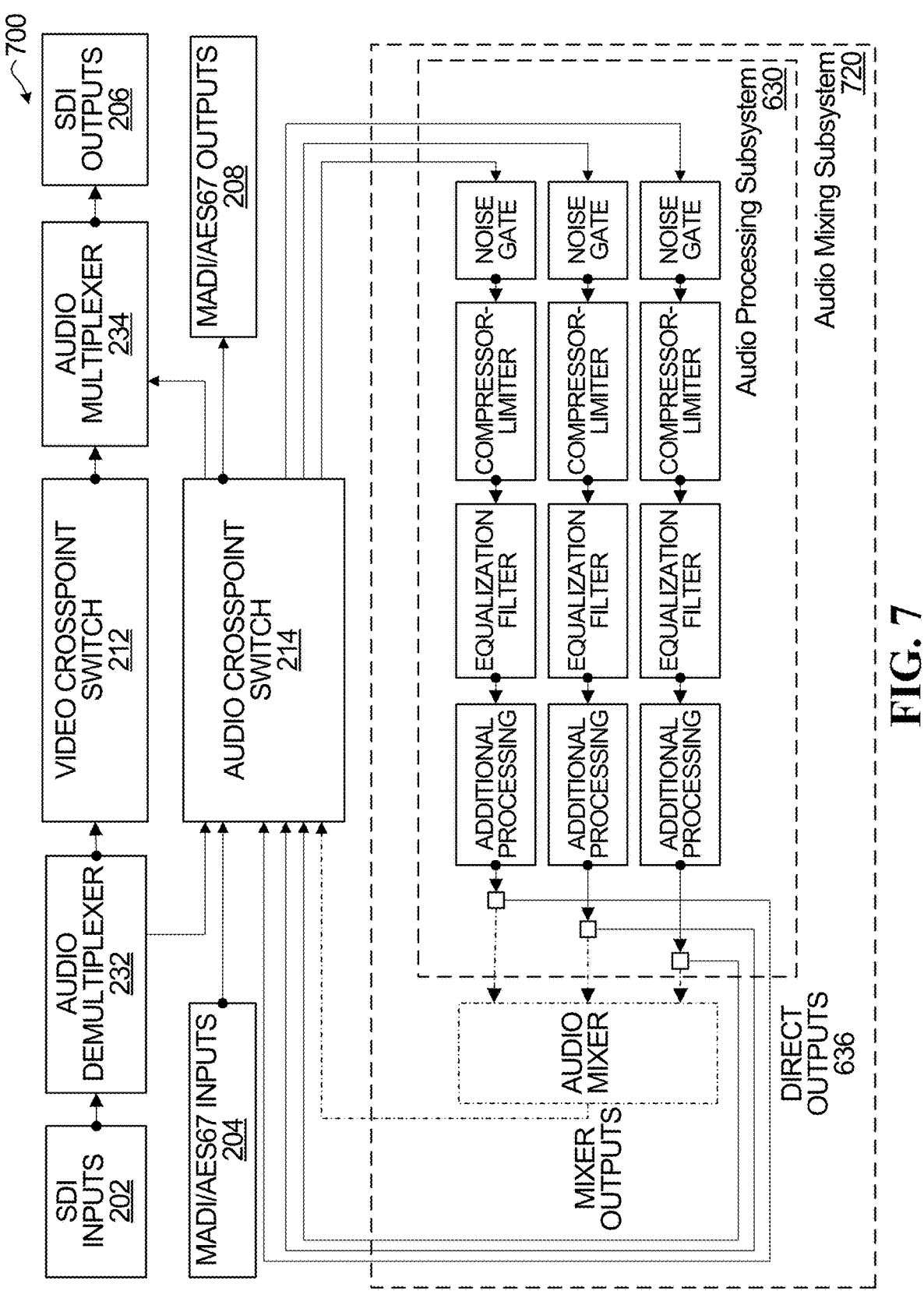
FIG. 7 is a block diagram of another example video router with a processing subsystem.

FIG. 7 is a block diagram of another example video router with a processing subsystem. The video router 700 is substantially similar to other example video routers described herein, and implementation options disclosed elsewhere herein also apply to the video router 700 and components thereof.

The video router 700 includes an audio processing subsystem 630, with the same processing components as the video router 600 in FIG. 6. In FIG. 7, the audio mixer and the mixer outputs are shown in dashed lines to illustrate that a processing subsystem such as the audio processing subsystem 630 may be implemented with or without audio mixing, or that audio mixing may potentially be turned off, disabled, bypassed, or otherwise inactive for at least some processing paths. A direct processing output feature may, for example, enable a processing path to be used for processing an audio signal, without necessarily also occupying an audio mixer input.

If an audio mixer is provided, then the example video router 700 includes an audio mixing subsystem 720, but in some embodiments, a video router may include a processing subsystem that is not necessarily part of an audio mixing subsystem.

FIG. 7 further highlights an aspect of a direct output feature, and in particular the fact that this feature can be used without an audio mixer. Audio signal processing may be used independently of an audio mixer in some embodiments. For example, audio signals may be routed from the direct outputs 636 to inputs that feed processing paths, thereby providing for cascaded processing, with or without mixing.

FIG. 7 depicts a scenario in which some audio signals are fed to the audio processing subsystem 630 and a direct output feature provided by the direct outputs 636 is used to provide processing only for selected audio signals to which processing is to be applied. This may be the case, for example, when a production has certain signals such as satellite feeds, or streamed audio from a video conferencing system, that require noise filtering, equalization or compression to improve the intelligibility or sound of the audio for the production.

Figure 8:
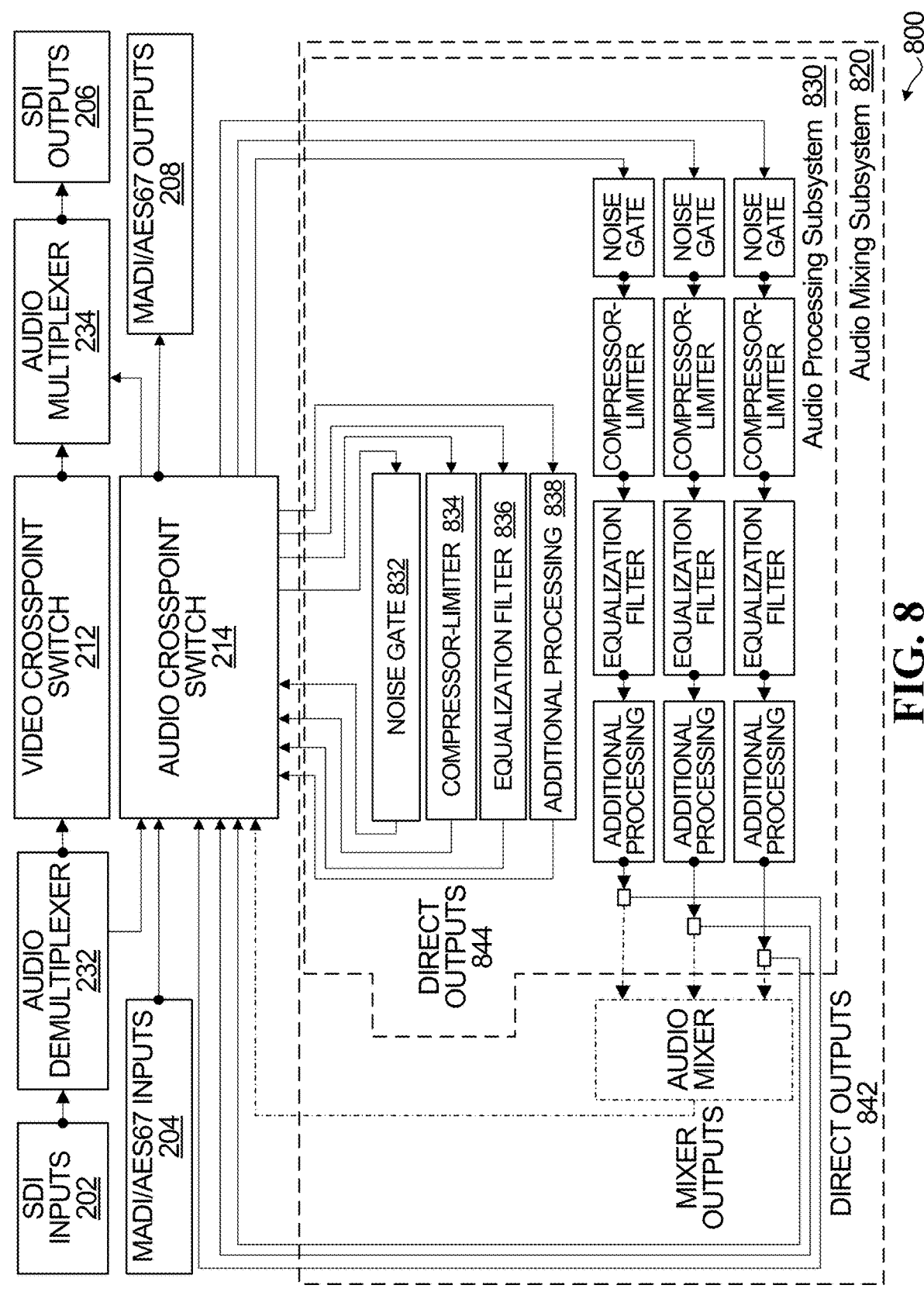
FIG. 8 is a block diagram of another example video router with a processing subsystem that provides per-path and per-processing operation direct outputs.

FIG. 8 is a block diagram of another example video router with a processing subsystem that provides per-path and per-processing operation direct outputs. The video router 800 is substantially similar to other example video routers described herein, and implementation options disclosed elsewhere herein also apply to the video router 800 and components thereof.

The video router 800 includes an audio processing subsystem 830, with the same processing components as the video router 600 in FIG. 6. In FIG. 8, the audio mixer and the mixer outputs are shown in dashed lines to again illustrate that a processing subsystem such as the audio processing subsystem 830 may be implemented with or without audio mixing, or that audio mixing may potentially be turned off, disabled, bypassed, or otherwise inactive for at least some processing paths. If an audio mixer is provided, then the example video router 800 includes an audio mixing subsystem 820.

Per-processing path direct outputs are shown at 842, and additional direct outputs are also shown at 844. Processing components including a noise gate 832, a compressor-limiter 834, an equalization filter 836, and an additional processing component 838 are shown with separate inputs from the audio crosspoint switch 214 and separate direct outputs 844 to illustrate that a direct output feature may be provided on a per-processing component or per-processing operation basis, in addition to or instead of the per-path direct outputs 842. The inputs and direct outputs of the noise gate 832, the compressor-limiter 834, the equalization filter 836, and the additional processing component 838 are illustrated separately from the processing paths in FIG. 8 in an effort to avoid further congestion in the drawing. Any or all processing paths may include per-path direct outputs 842, and any one or more processing components or operations in each path may include a per-component or per-operation direct output 844 coupled to the audio crosspoint switch 214. Such direct outputs may be configurable, and different paths may have different direct output configurations.

Figure 9:
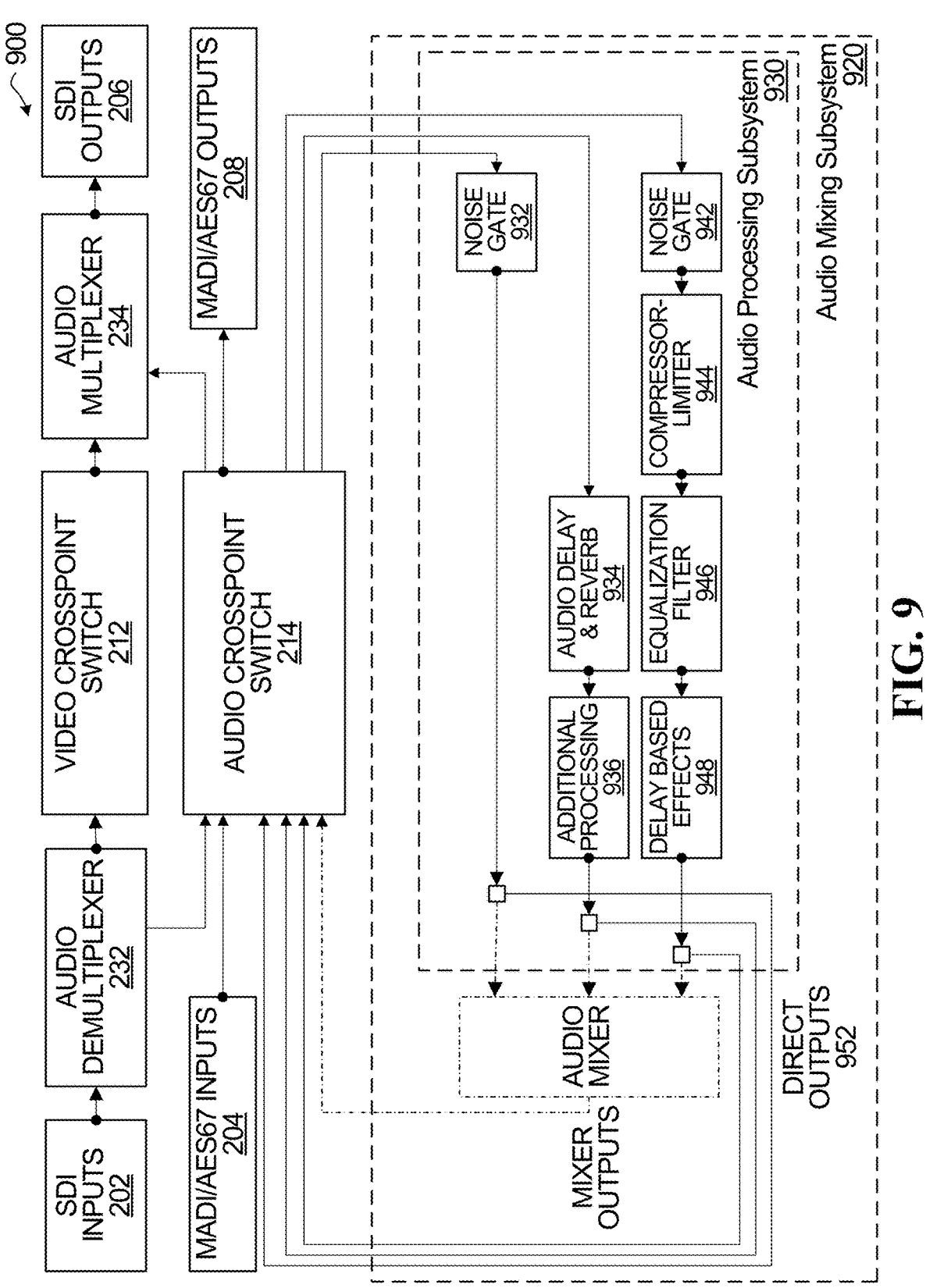
FIG. 9 is a block diagram of another example video router with a processing subsystem in which processing operations may be selectively applied in processing paths.

FIG. 9 is a block diagram of another example video router with a processing subsystem in which processing operations may be selectively applied in processing paths. The video router 900 is substantially similar to other example video routers described herein, and implementation options disclosed elsewhere herein also apply to the video router 900 and components thereof.

The video router 900 includes an audio processing subsystem 930, which may but need not necessarily be part of an audio mixing subsystem 920. In the example shown, there are three processing paths, each with an input that is fed from an output of the audio crosspoint switch 214 and a direct output 952 to an input of the audio crosspoint switch. The processing paths are configured to apply different processing operations. A first processing path includes a noise gate 932, a second processing path includes an audio delay and reverb component 934 and an additional processing component 936, and a third processing path includes a noise gate 942, a compressor-limiter 944, an equalization filter 946, and a delay based effects component 948.

FIG. 9 highlights that individual processing operations or components may be implemented in different processing paths. For example, one or more processing operations or components may be turned off, bypassed, disabled, or otherwise in effect removed from any processing path. Processing operations or components may alternatively be inactive or disabled unless turned on, enabled, or otherwise added into a processing path. Such processing operation or component control or selectivity may enable processing operations or components to be used individually and independently of one another.

Figure 10:
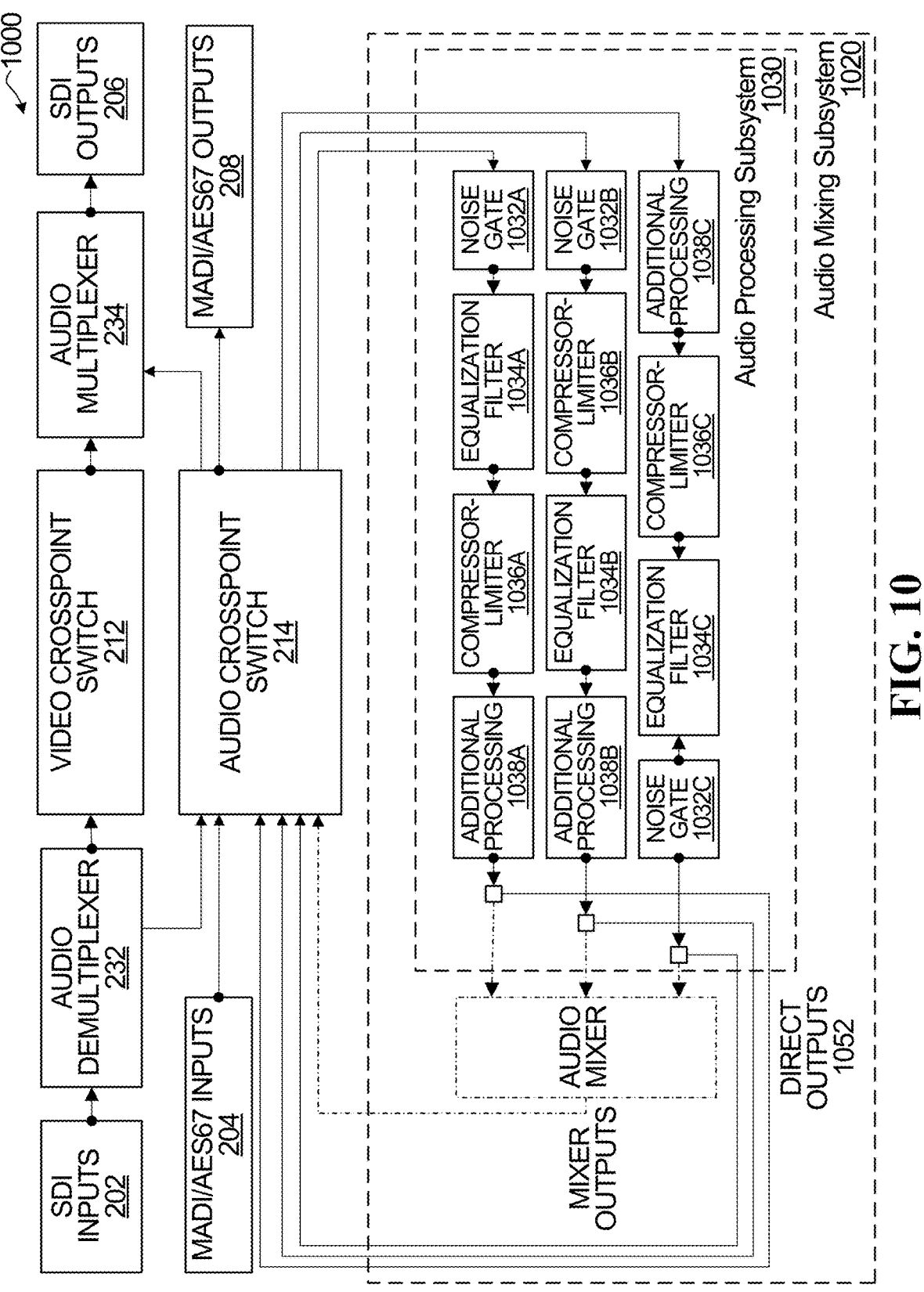
FIG. 10 is a block diagram of another example video router with a processing subsystem in which processing operations may be applied in different orders in different processing paths.

FIG. 10 is a block diagram of another example video router with a processing subsystem in which processing operations may be applied in different orders in different processing paths. The video router 1000 is substantially similar to other example video routers described herein, and implementation options disclosed elsewhere herein also apply to the video router 1000 and components thereof.

The video router 1000 includes an audio processing subsystem 1030, which may but need not necessarily be part of an audio mixing subsystem 1020.

The audio processing subsystem 1030 includes three processing paths, each of which receives an audio signal at an output of the audio crosspoint switch 214. A first processing path includes a noise gate 1032A, an equalization filter 1034A, a compressor-limiter 1036A, and an additional processing component 1038A. A second processing path includes a noise gate 1032B, a compressor-limiter 1036B, an equalization filter 1034B, and an additional processing component 1038B. A third processing path includes an additional processing component 1038C, a compressor-limiter 1036C, an equalization filter 1034C, and a noise gate 1032C. The processing paths feed direct outputs 1052.

FIG. 10 highlights that the order of individual processing components or operations may be different in different processing paths, and may be changed in some embodiments, to enable different combinations of effects or to enable application of transformations in different orders for example.

FIG. 8 illustrates a re-entry configuration of processing components or operations. Such re-entry may be used to achieve the different processing block orderings or selective block inclusion, including the processing path examples as shown in FIGS. 8, 9, and 10. This feature may allow processing to be applied in any order that is necessary or desirable to suit an end user application, for example equalizing a signal after limiting or compressing the signal, or applying a delay function before equalization instead of afterward, rather than limiting processing based on a fixed processing order. This could be useful, for example, in a scenario in which an application requires a mix to be created and then passed through a compressor-limiter and/or an equalization filter. Configurable processing may also or instead be useful to enable more effective management or usage of audio processing resources. As an example, two equalization filters could be allocated to one processing path or input, to use an equalization filter that might otherwise have been unused on an input that did not need it.

Figure 11:
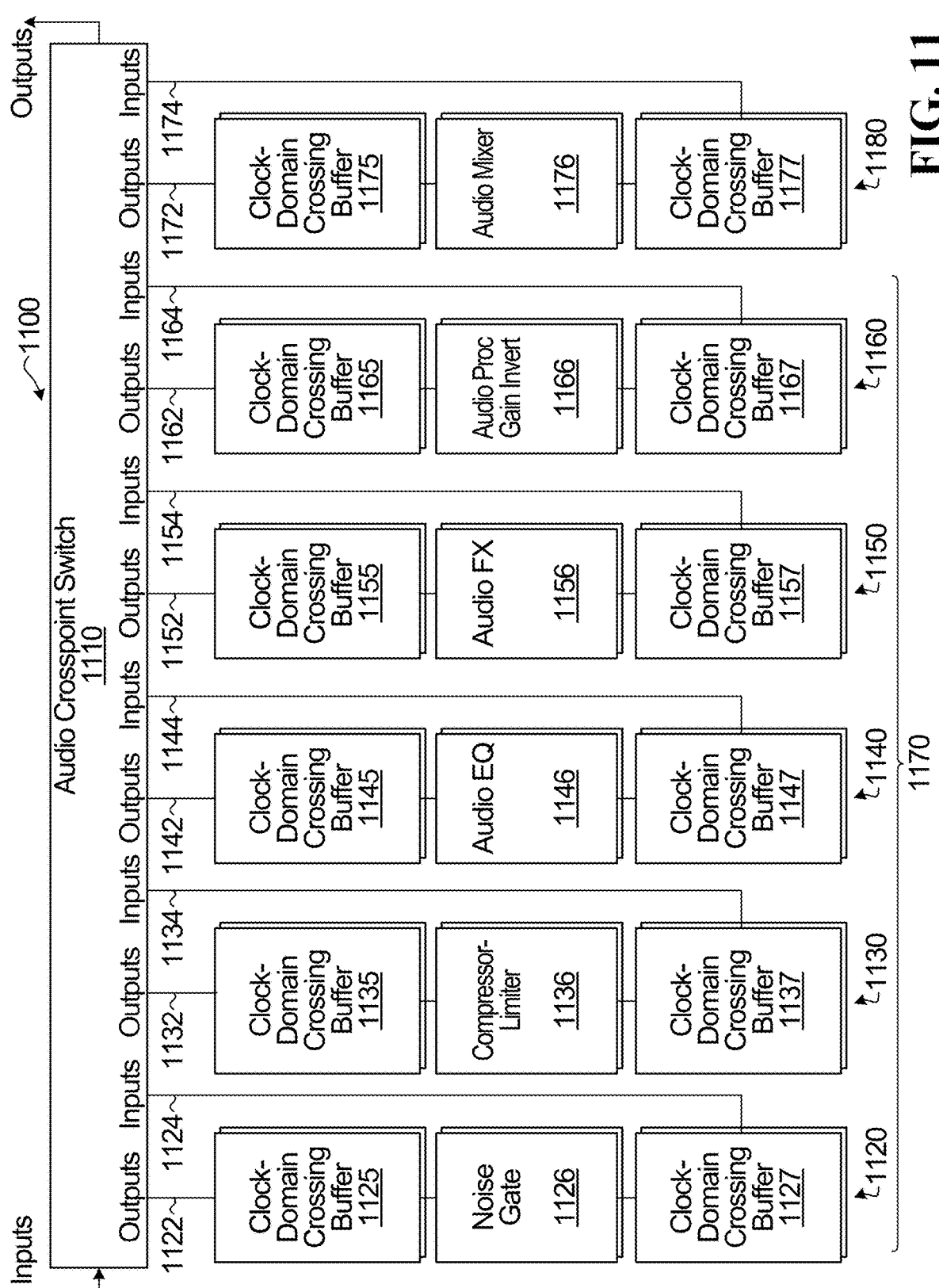
FIG. 11 is a block diagram of an example audio subsystem for a video router.

FIG. 11 is a block diagram of an example audio subsystem for a video router. The example audio subsystem 1100 includes an audio crosspoint switch 1110. An audio processing subsystem 1170 provides five types of processing components. In FIG. 11, one instance of each processing component is shown in a respective processing path at 1120, 1130, 1140, 1150, and 1160. Audio mixing components are also shown, at 1180.

Each processing path at 1120, 1130, 1140, 1150, and 1160 has an input coupled to an output of the audio crosspoint switch 1110 at 1122, 1132, 1142, and 1152. In the example shown, each processing path at 1120, 1130, 1140, 1150, and 1160, includes an input clock-domain crossing buffer 1125, 1135, 1145, 1155, and 1165, a processing component 1126, 1136, 1146, 1156, and 1166, and an output clock-domain crossing buffer 1127, 1137, 1147, 1157, and 1167. Direct outputs from the processing paths are coupled to inputs of the audio crosspoint switch 1110 at 1124, 1134, 1144, 1154, and 1164. Although only one processing path of each type is shown in FIG. 11, there may be multiple instances of each processing path, to provide audio processing for multiple signals or channels. For example, each processing path may be coupled to a respective one of multiple output channels and a respective one of multiple input channels of the audio crosspoint switch 1110. Similarly, the processing path components, including input and output clock-domain crossing buffers and the processing components, may be implemented for per-channel processing.

The representation of processing paths in FIG. 11 is intended to illustrate different types of processing components and processing paths with direct outputs, and not to imply or indicate that the example audio subsystem 1100 may support only processing paths that include a single processing component. In some embodiments, any one or more of these processing components, and/or others, may be configured, enabled, instantiated or otherwise implemented in a processing path. The processing path representations in FIG. 11 are similar to those shown in FIG. 8 and described at least above.

The audio mixing components at 1180 include input clock-domain crossing buffers 1175, each with an input coupled to an output of the audio crosspoint switch 1110 at 1172, one or more audio mixers 1176, and output clock-domain crossing buffers 1177 with outputs coupled to inputs of the audio crosspoint switch 1110.

In an embodiment, the audio crosspoint switch 1110 is a full TDM audio crosspoint switch that accepts input signals on its inputs, and each input signal may be routed to any of its outputs. Some of the audio crosspoint switch inputs and outputs are represented in FIG. 11, including audio crosspoint switch outputs at 1122, 1132, 1142, 1152, 1162, and 1172, and audio crosspoint switch inputs at 1124, 1134, 1144, 1154, 1164, and 1174. The audio crosspoint switch 1110 also has other inputs, shown generally at the left-hand side of FIG. 11, that may be coupled directly or indirectly, through an audio demultiplexer for example, to router inputs to receive router input signals. Other audio crosspoint switch outputs are similarly shown at the right-hand side of FIG. 11, and may be coupled directly or indirectly, through an audio multiplexer for example, to router outputs to provide output signals for output from a video router. The ability of the audio crosspoint switch 1110 to control which input connects to each output can be used to construct signal pathways and signal flows as described elsewhere herein.

Implementation examples that are provided elsewhere herein apply to most of the components in FIG. 11, including the audio crosspoint switch 1110, the processing components in each processing path, and the audio mixer 1176. Clock-domain crossing buffers are described by way of example at least below.

The clock-domain crossing buffers in FIG. 11 are buffers that are used to enable resampling of digital audio samples, between 48 KHz or 50 kHz sample rates for example, for compatibility between the audio processing components and the audio crosspoint switch 1110. The input clock-domain crossing buffers 1125, 1135, 1145, 1155, 1165, and 1175 are each used to resample signals from the audio crosspoint switch 1110 for compatibility with the audio processing blocks 1126, 1136, 1146, 1156, and 1166 and the audio mixer 1176. Similarly, the output clock-domain crossing buffers 1127, 1137, 1147, 1157, 1167, and 1177 are used to resample the processed signals or mixed signals on respective channels to be provided back to inputs of the audio crosspoint switch 1110.

The processing components shown in FIG. 11 include a noise gate 1126, a compressor-limiter 1136, and an equalization filter 1146, examples of which are provided elsewhere herein. The audio effects component 1156 is an additional processing component to transform an audio signal, and examples of processing operations that may be performed by additional processing components are also provided elsewhere herein. An audio processing gain inverter 1166 is used to adjust the amplitude of an audio signal, and can invert the phase of the signal.

FIG. 11 illustrates how processing components may be coupled to an audio crosspoint switch in a way that can be reconfigured in some embodiments to realize any of the audio processing paths or chains, such as those shown in FIGS. 6 to 10.

In some embodiments, via re-programming one or more FPGAs for example, an audio subsystem can support "hard wiring" configurations to support specific connections between audio processing components and other components. The example illustrated in FIG. 11 may support a more fully flexible re-entry feature, according to which processed audio signals re-enter an audio crosspoint switch via direct outputs, but an FPGA re-programming mode may also be useful to provide one or more fixed processing paths. A fixed processing path need not necessarily be entirely fixed in that a processing path that is configured via FPGA re-programming may be changed, but in general such a processing path may be less dynamic or flexible than a processing path that is implemented as shown by way of example in FIG. 11. In FIG. 11, direct processing outputs with re-entry into the audio crosspoint switch 1110 may enable more flexible processing by reconfiguring the audio crosspoint switch to route audio signals for cascaded processing by multiple processing components or operations. A direct output from one processing path to an input of the audio crosspoint switch 1110, for example, may be routed to an audio crosspoint switch output that is coupled to an input of a different processing path, to cascade processing operations and to potentially provide multiple processed versions or outputs of the same audio signal.

It should be appreciated that FIG. 11, and similarly FIG. 12 described below, are specific examples that relate to particular embodiments with such features as re-sampling between an audio crosspoint switch and other components using clock-domain crossing buffers. These drawings also refer to specific example clock or sample rates, numbers of channels, and numbers of various components. These features are solely for illustrative purposes. Other embodiments may, but need not necessarily, include these features. It is further noted that the illustrated embodiments may include other features disclosed herein, such as a partitionable audio mixer at 1176 for example.

Figure 12:
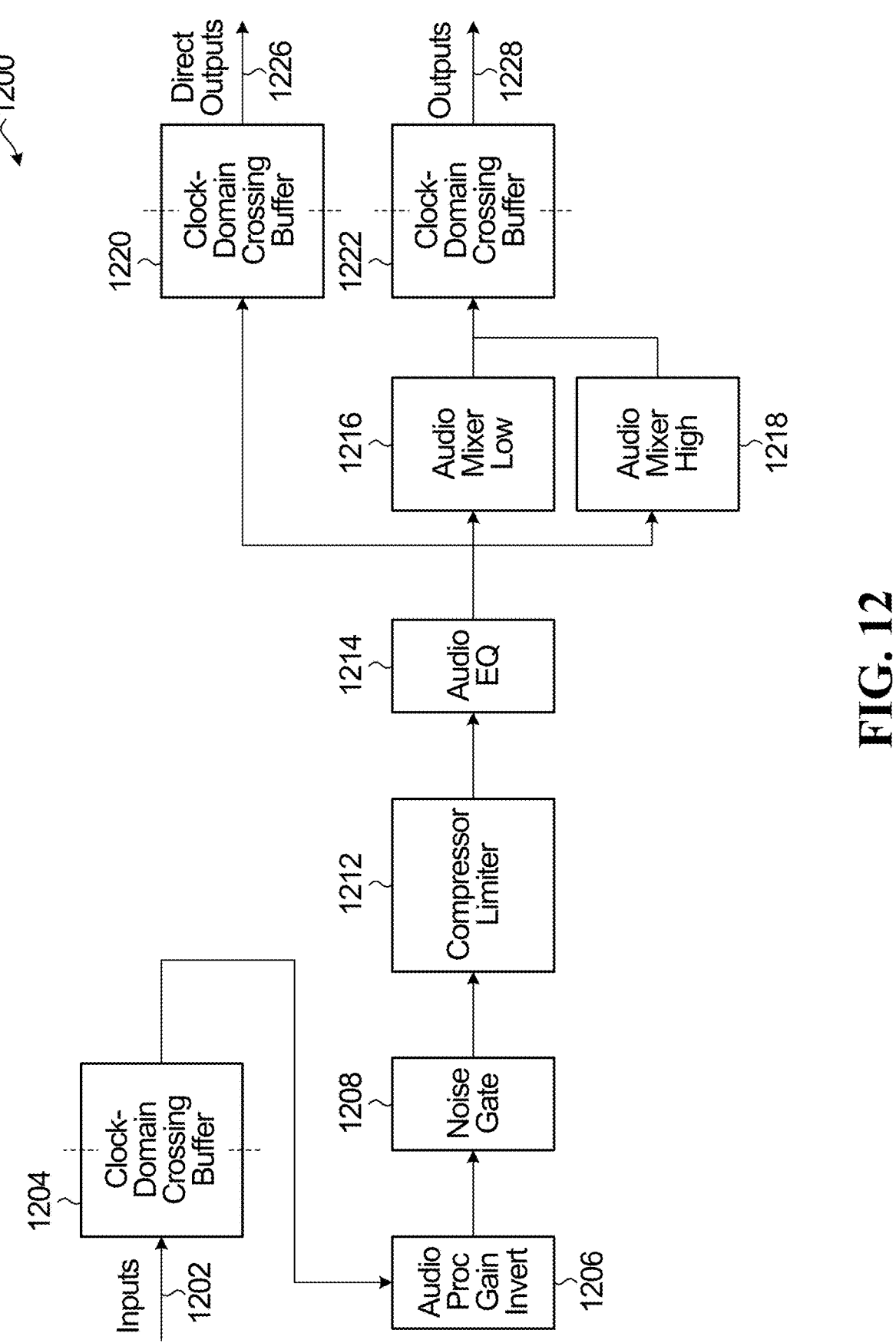
FIG. 12 is a block diagram of an example audio mixing subsystem for a video router.

FIG. 12 is a block diagram of an example audio mixing subsystem for a video router. The example audio mixing subsystem 1200 highlights a specific example implementation of a signal flow. Inputs are shown at 1202, and are coupled to clock-domain crossing buffers 1204. The outputs of the clock-domain crossing buffers 1204 are coupled to an audio processing gain inverter 1206, which is coupled to inputs of noise gates 1208. Outputs of the noise gates 1208 are coupled to inputs of compressor-limiters 1212, the outputs of which are coupled to inputs of audio equalization filters 1214. Outputs of the audio equalization filters 1214 are coupled to inputs of audio mixers 1216 and 1218, and to clock-domain crossing buffers 1220. Outputs of the audio mixers 1216 and 1228 are coupled to clock-domain crossing buffers 1222. Direct processing outputs from the clock-domain crossing buffers 1220 are shown at 1226, and mixer outputs from the clock-domain crossing buffer 1222 are shown at 1228.

The mixing subsystem 1200 receives audio signals on the inputs 1202. Those audio signals are input into clock-domain crossing buffers 1204 and resampled for compatibility with the processing components in the example processing paths shown. The resampled audio signals are output, as time division multiplexed audio signals in some embodiments.

The resampled audio signals are transformed by one or more of the processing components 1206, 1208, 1212, and 1214 in each processing path. Processed audio signals are provided to the clock-domain crossing buffers 1220, which resample the signals before they are provided back to an audio crosspoint switch on the direct outputs 1226.

The audio mixing subsystem 1200 includes two audio mixers 1216 and 1218. The audio mixer 1216 mixes input signals to generate a first set of mixed outputs, and is referenced as "Mixer Low" in FIG. 12. The audio mixer 1218 mixes the same input signals to generate a second set of mixed outputs, and is referenced as "Mixer High" in FIG. 12. Together, the two audio mixers 1216 and 1218 provide mixed audio signals, which are resampled by the clock-domain crossing buffers 1222 to provide output mixed audio signals at 1228, which may be directed to an audio crosspoint switch.

In an embodiment, each of the audio mixers 1216 and 1218 is a 128-input by 32-output mixer, and in combination they implement, in total, a 128×64 mixer system. More generally, the two audio mixers 1216, 1218 in parallel effectively doubles the number of mixer outputs, and as many mixers as are needed to provide a desired number of inputs and outputs may be added or configured.

Embodiments disclosed herein, with reference to FIGS. 1 to 12 for example, encompass a video router that includes router inputs to receive router input video signals and router input audio signals, router outputs to provide router output video signals and router output audio signals, and an audio subsystem. Router inputs are shown by way of example at 202, 204 and router outputs are shown by way of example at 206, 208 in FIGS. 2 to 10. An example of an audio subsystem is shown by way of example in FIG. 11, and more generally an audio subsystem may include an audio crosspoint switch and an audio mixing subsystem and/or an audio processing subsystem such as those shown by way of example in FIGS. 2 to 10.

In some embodiments, an audio subsystem is coupled to router inputs and router outputs, to receive and mix at least some of the router input audio signals to generate or provide mixed audio signals, and to route the mixed audio signals to the router outputs as router output audio signals. For example, an audio subsystem may include an audio crosspoint switch to receive input audio signals that include the router input audio signals that are input to the router inputs and to route the input audio signals as output audio signals that include the router output audio signals to be output from the video router through the router outputs. The input audio signals received by an audio crosspoint switch include router input audio signals, but also include other input audio signals, such as mixed audio signals and/or direct outputs from audio signal processing. Similarly, output audio signals from an audio crosspoint switch include router output audio signals to be output from a video router, but also include other input audio signals, such as output audio signals that are to be processed and/or mixed. The example audio crosspoint switches in FIGS. 2 to 11 are all coupled to receive router input audio signals and other input audio signals and to route the input audio signals as router output audio signals and other output audio signals.

An audio subsystem may also include an audio mixing subsystem, coupled to the audio crosspoint switch, to receive router input audio signals as output audio signals from the audio crosspoint switch and to provide to the audio crosspoint switch the mixed audio signals. The input audio signals of the audio crosspoint switch therefore further include the mixed output audio signals. In the examples shown in FIGS. 2 to 11, mixed output audio signals may be provided to an audio crosspoint switch.

An audio mixing subsystem may include an audio mixer, as shown by way of example in FIG. 3, to generate mixed audio signals. For example, router input audio signals may be routed to the audio mixer 322 by the audio crosspoint switch 214, and the audio mixer may generate mixed audio signals at the mixer outputs 326 by summing router input audio signals at respective ratios.

In some embodiments, an audio mixer is configurable to be partitioned into multiple audio mixers, as shown by way of example in FIGS. 4 and 5. Each of the multiple audio mixers is configured to generate a respective subset of mixed audio signals, by summing a respective subset of mixer input signals, such as router input audio signals that are routed for mixing by the audio crosspoint 214, at respective ratios.

Each respective subset of audio signals to be mixed by one of multiple partitioned mixers may include an equal number of audio signals, or the subsets may include subsets with different numbers of audio signals. Similarly, each respective subset of mixed audio signals generated by one of multiple partitioned mixers may include an equal number of mixed audio signals, or the subsets may include subsets with different numbers of mixed audio signals.

In some embodiments, an audio subsystem is configured to process audio signals prior to mixing the audio signals. For example, an audio mixing subsystem may include a processing subsystem, coupled to an audio crosspoint switch and to an audio mixer, to process audio signals prior to mixing. Audio signals may also or instead be processed after mixing. Re-entry as described herein provides an example of how processing may be applied to mixed audio signals.

Embodiments that include audio signal mixing may or may not also include audio signal processing. Similarly, embodiments that include audio signal processing may or may not also include audio signal mixing. Regarding processing embodiments, a video router may include crosspoint switches and a processing subsystem. Examples are shown in FIGS. 2 to 11.

The crosspoint switches in such a video router may include a video crosspoint switch to receive router input video signals received by the video router and to route the router input video signals as router video output signals to be output from the video router. An audio crosspoint switch may also be provided, to receive input audio signals and to route the input audio signals as output audio signals. The audio crosspoint input audio signals include router input audio signals received by the video router, but also include other input audio signals as well. The output audio signals from an audio crosspoint include router output audio signals to be output from the video router, and also include other output signals. Router input audio signals, other input audio signals, router output audio signals, and other output audio signals are illustrated by way of example for the audio crosspoint switches in each of FIGS. 2 to 11.

In some embodiments, a processing subsystem is to provide multiple processing paths to receive and process respective output audio signals from an audio crosspoint switch and to generate respective processed output audio signals. The input audio signals of the audio crosspoint switch also the processed output audio signals of the processing paths. Input audio signals to an audio crosspoint switch from an audio signal processing system are shown by way of example as being provided through the direct outputs in FIGS. 2 and 6 to 12.

Router input audio signals may be or include an embedded audio signal embedded with one of the router input video signals, as in the case of SDI signals for example. A video router may include an audio demultiplexer, shown by way of example at 232 in FIGS. 6 to 10, coupled to an audio crosspoint switch to extract an embedded audio signal from a router input video signal. There may be one or more router input video signals that include an embedded audio signal to be extracted by an audio demultiplexer.

Router output audio signals may be or include an audio signal to be embedded with one of the router output video signals, such as an SDI output signal. A video router may include an audio multiplexer, shown by way of example at 234 in FIGS. 6 to 10, coupled to an audio crosspoint switch to embed an audio signal with a router output video signal.

There may be one or more router output audio signals to be embedded with a router output video signal by an audio multiplexer.

Processing paths as disclosed herein may include a processing path to receive one of the output audio signals from an audio crosspoint switch, to apply multiple processing operations to that output audio signal to generate respective processed audio signals, and to provide the processed audio signals to the audio crosspoint switch. There may be one or more such processing paths with this type of per-component or per-operation direct output to an audio crosspoint switch.

The processing paths provided by an audio processing subsystem may also or instead include a processing path to receive an output audio signal from an audio crosspoint switch, and to selectively apply any of multiple processing operations to that output audio signal. This type of selectivity may be used to apply different processing operations to different audio signals, as shown by way of example in FIG. 9.

Another processing path feature that may be provided in some embodiments relates to order of processing operations. A processing subsystem may be configurable to provide processing paths to apply multiple processing operations to output audio signals from an audio crosspoint switch in respective different orders, as shown by way of example in FIG. 10.

Cascaded processing is also possible. In some embodiments, an audio crosspoint switch is configurable to route a processed output audio signal from a processing paths to another processing path for further processing, to thereby cascade processing operations.

A video router may also include an audio mixer, coupled to a processing subsystem, to receive any or all processed output audio signals from the processing subsystem and to provide mixed output audio signals based on the processed output audio signals. The mixed output audio signals may be provided to an audio crosspoint switch, in which case the input audio signals of the audio crosspoint switch further include, in addition to other input signals, the mixed output audio signals.

These embodiments are illustrative of apparatus embodiments, implemented in a video router. Other embodiments, such as method embodiments, are also possible. A non-transitory processor-readable medium may store instructions which, when executed by a processor, cause the processor to perform a method. Such media are illustrative of further embodiments in which features disclosed herein may be implemented.

Figure 13:
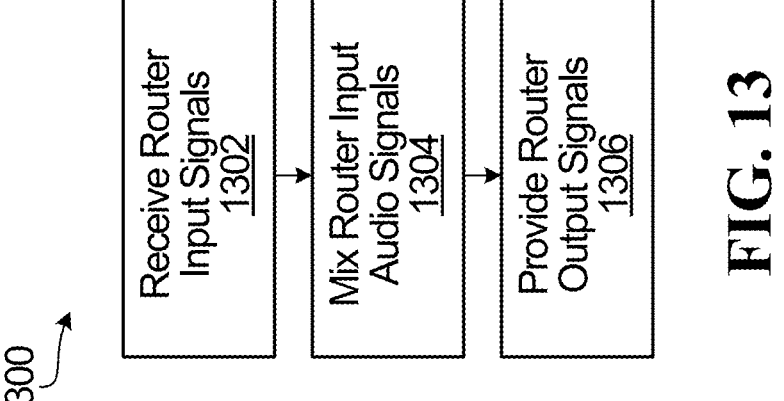
FIG. 13 is a flow diagram illustrating a method according to a further embodiment.

Method embodiments, including methods embodied in instructions stored in a non-transitory processor-readable medium, may provide mixing features, processing features, or both. FIG. 13 is a flow diagram illustrating a method according to one embodiment.

The example method 1300 involves receiving router input signals at 1302. This may involve receiving router input video signals and router input audio signals at router inputs of a video router, for example. At 1304, the example method 1300 involves mixing router input audio signals, which may involve receiving and mixing, by an integrated audio subsystem of the video router, at least some of the router input audio signals to generate mixed audio signals. Such a method may also involve providing router output video signals and router output audio signals to router outputs of the video router, at 1306. Providing the router output signals may involve routing, by the integrated audio subsystem, the mixed audio signals to the router outputs as the router output audio signals.

FIG. 13 is an illustrative and non-limiting example. Other embodiments may include additional, fewer, and/or different operations, performed in a similar or different order. Various ways to perform operations, and other variations in the example method 1300, may be or become apparent from the descriptions of other embodiments herein, such as video router embodiments for example.

The following features are illustrative of features that may be provided, individually or in any of various combinations, in some embodiments:

the receiving an mixing involve receiving router input audio signals as routed audio signals that are routed for the mixing, by an audio crosspoint switch for example, and providing the mixed audio signals for further routing by the integrated audio subsystem;

the mixing involves generating the mixed audio signals by summing router input audio signals at respective ratios;

the mixing involves partitioning the mixing into multiple mixing partitions to generate respective subsets of mixed audio signals by summing respective subsets of router input audio signals at respective ratios;

each respective subset of router input audio signals includes an equal number of router input audio signals;

each respective subset of mixed audio signals includes an equal number of mixed audio signals;

the respective subsets of router input audio signals include subsets with different numbers of router input audio signals;

the respective subsets of mixed audio signals include subsets with include different numbers of mixed audio signals;

processing of audio signals by the integrated audio subsystem prior to the mixing.

Figure 14:
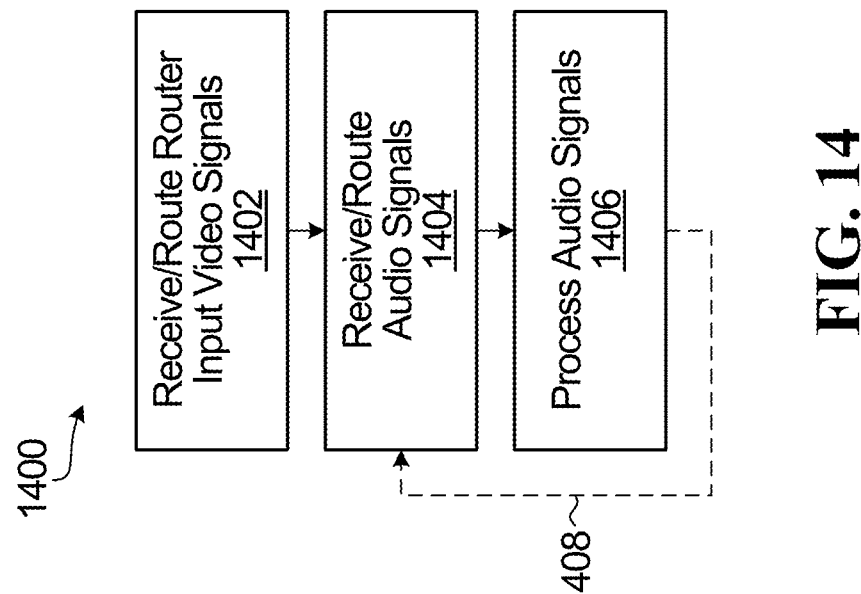
FIG. 14 is a flow diagram illustrating a method according to another embodiment.

FIG. 14 is a flow diagram illustrating an example method 1400 according to another embodiment. The example method 1400 involves receiving and routing router input video signals at 1402. This may involve receiving router input video signals that are received by a video router, and routing the router input video signals as router video output signals to be output from the video router. At 1404, audio signals are received and routed. This is shown separately from video signal reception and routing at 1402 for illustrative purposes, and in some embodiments video and audio signal routing are ongoing at the same time.

Audio signal reception and routing at 1404 may involve receiving input audio signals that include router input audio signals that are received by the video router, and routing the input audio signals as output audio signals that include router output audio signals to be output from the video router. As described elsewhere herein, audio input signal and audio output signals do not include only router input and output signals.

At 1406, FIG. 14 illustrates processing of audio signals, which in some embodiments involves processing respective output audio signals, which are routed for processing at 1404, to provide respective processed output audio signals. The input audio signals for the routing at 1404 further include the processed output audio signals from 1406, and this is illustrated by the dashed arrow 1408. Such processing and return or re-entry of processed audio signals to an audio crosspoint switch, for example, is shown in FIGS. 2 and 6 to 12.

FIG. 14, like FIG. 13, is an illustrative and non-limiting example. Other embodiments may include additional, fewer, and/or different operations, performed in a similar or different order, and various ways to perform operations and/or other variations in the example method 1400, may be or become apparent from the descriptions of other embodiments herein, such as video router embodiments.

The following features are illustrative of features that may be provided, individually or in any of various combinations, in some embodiments:

router input audio signals include an embedded audio signal embedded with a router input video signal;

extracting an embedded audio signal from a router input video signal;

router output audio signals include an audio signal to be embedded with a router output video signal;

embedding an audio signal with a router output video signal;

processing involves applying multiple processing operations to an output audio signal to generate multiple processed audio signals based on the output audio signal, and the input audio signals for the routing further includes the multiple processed audio signals based on the output audio signal;

the processing involves selectively applying any of multiple processing operations to an output audio signal;

the processing is configurable to apply multiple processing operations to respective output audio signals in respective different orders;

the routing of the input audio signals is configurable to route a processed output audio signal for further processing;

mixing the processed output audio signals to provide mixed output audio signals based on the respective processed output audio signals, and the input audio signals for the routing further include the mixed output audio signals.

The present disclosure includes many features that may be implemented individually or in any of various combinations in video routing. Disclosed embodiments include integration of an audio mixer or audio mixing into a video router or video routing.

Direct outputs that allow, for example, processing-only application for some signals without requiring dedication of mixer output channels and without being dependent upon mixability of a signal, are also disclosed.

Partitioning or sub-partitioning of an audio mixer or audio mixing, as also disclosed herein, may make more efficient use of available resources.

A re-entrant or re-entry configuration for processing may enable the processing components or operations to be selectively applied, re-assigned between processing paths, and/or re-ordered, for example.

Numerous modifications and variations of the present disclosure are possible in light of the above teachings. It is therefore to be understood that within the scope of the appended claims, the disclosure may be practiced otherwise than as specifically described herein.

The divisions of functions represented in the drawings, for example, are solely for illustrative purposes. Other embodiments could include fewer, more, and/or different components than explicitly shown, interconnected in the same or a different order. Regarding different interconnections or components, for example, direct outputs are disclosed primarily as internal outputs, within a video router, that are coupled to an audio crosspoint switch. In other embodiments direct outputs may be implemented as router outputs. Methods could similarly include fewer, more, and/or different operations performed in a similar or different manner than explicitly described herein.

In addition, although described primarily in the context of apparatus and methods, other implementations are also contemplated, as instructions stored on a non-transitory processor-readable medium, for example.

More generally, disclosure of any feature in the context of any particular embodiment does not necessarily limit a feature only to that embodiment. Features disclosed in the context of one embodiment may also or instead be implemented in other embodiments.

The invention claimed is:

1. A video router comprising:
a video crosspoint switch to receive router input video signals received by the video router and to route the router input video signals as router video output signals to be output from the video router;
an audio crosspoint switch to receive input audio signals comprising router input audio signals received by the video router and to route the input audio signals as output audio signals comprising router output audio signals to be output from the video router;
a processing subsystem to provide a plurality of processing paths to receive and process respective ones of the output audio signals from the audio crosspoint switch and to generate respective processed output audio signals, the input audio signals of the audio crosspoint switch further comprising the processed output audio signals of the processing paths.

2. The video router of claim 1, wherein the router input audio signals comprise an embedded audio signal embedded with one of the router input video signals.

3. The video router of claim 2, further comprising:
an audio demultiplexer, coupled to the audio crosspoint switch, to extract the embedded audio signal from the one of the router input video signals.

4. The video router of claim 1, wherein the router output audio signals comprise an audio signal to be embedded with one of the router output video signals.

5. The video router of claim 4, further comprising:
an audio multiplexer, coupled to the audio crosspoint switch, to embed the audio signal with the one of the router output video signals.

6. The video router of claim 1, wherein the processing paths comprise a processing path to receive one of the output audio signals from the audio crosspoint switch, to apply multiple processing operations to the one of the output audio signals to generate respective processed audio signals, and to provide the processed audio signals to the audio crosspoint switch.

7. The video router of claim 1, wherein the processing paths comprise a processing path to receive one of the output audio signals from the audio crosspoint switch, and to selectively apply any of multiple processing operations to the one of the output audio signals.

8. The video router of claim 1, wherein the processing subsystem is configurable to provide processing paths to apply multiple processing operations to output audio signals from the audio crosspoint switch in respective different orders.

9. The video router of claim 1, wherein the audio crosspoint switch is configurable to route one of the processed output audio signals from one of the processing paths to another one of the processing paths for further processing.

10. The video router of claim 1, further comprising:
an audio mixer, coupled to the processing subsystem, to receive the respective processed output audio signals and to provide to the audio crosspoint switch mixed output audio signals based on the respective processed output audio signals, the input audio signals of the audio crosspoint switch further comprising the mixed output audio signals.

11. A method comprising:

receiving router input video signals that are received by a video router;

routing the router input video signals as router video output signals to be output from the video router;

receiving input audio signals comprising router input audio signals that are received by the video router;

routing the input audio signals as output audio signals comprising router output audio signals to be output from the video router;

processing respective ones of the output audio signals to provide respective processed output audio signals, the input audio signals for the routing further comprising the processed output audio signals.

12. The method of claim 11, wherein the router input audio signals comprise an embedded audio signal embedded with one of the router input video signals.

13. The method of claim 12, further comprising:

extracting the embedded audio signal from the one of the router input video signals.

14. The method of claim 11, wherein the router output audio signals comprise an audio signal to be embedded with one of the router output video signals.

15. The method of claim 14, further comprising:

embedding the audio signal with the one of the router output video signals.

16. The method of claim 11, wherein the processing comprises applying multiple processing operations to one of the output audio signals to generate a plurality of processed audio signals based on the one of the output audio signals, the input audio signals for the routing further comprising the plurality of processed audio signals based on the one of the output audio signals.

17. The method of claim 11, wherein the processing comprises selectively applying any of multiple processing operations to one of the output audio signals.

18. The method of claim 11, wherein the processing is configurable to apply multiple processing operations to the respective ones of the output audio signals in respective different orders.

19. The method of claim 11, wherein the routing of the input audio signals is configurable to route one of the processed output audio signals for further processing.

20. The method of claim 11, further comprising: mixing the respective processed output audio signals to provide mixed output audio signals based on the respective processed output audio signals, the input audio signals for the routing further comprising the mixed output audio signals.

21. A non-transitory processor-readable medium storing instructions which, when executed by a processor, cause the processor to perform a method, the method comprising:

receiving router input video signals that are received by a video router;

routing the router input video signals as router video output signals to be output from the video router;

receiving input audio signals comprising router input audio signals that are received by the video router;

routing the input audio signals as output audio signals comprising router output audio signals to be output from the video router;

processing respective ones of the output audio signals to provide respective processed output audio signals, the input audio signals for the routing further comprising the processed output audio signals.

* * * * *